United States Patent [19]
Yoshizawa

[11] Patent Number: 5,887,482
[45] Date of Patent: Mar. 30, 1999

[54] APPARATUS FOR MUTUAL CONVERSION BETWEEN CIRCULAR MOTION AND RECIPROCAL MOTION

[75] Inventor: Yasuo Yoshizawa, Yonezawa, Japan

[73] Assignee: Yoshiki Industrial Co., Ltd., Yonezawa, Japan

[21] Appl. No.: 969,224

[22] Filed: Nov. 13, 1997

Related U.S. Application Data

[63] Continuation of Ser. No. 584,812, Jan. 11, 1996, abandoned.

[30] Foreign Application Priority Data

Jan. 13, 1995 [JP] Japan .................... 7-004061

[51] Int. Cl.$^6$ ................................ F16H 21/18
[52] U.S. Cl. ................... 74/44; 74/45; 92/138; 123/63; 123/197.3
[58] Field of Search ............... 74/44, 45; 92/138; 123/61 R, 63, 197.3

[56] References Cited

U.S. PATENT DOCUMENTS

| | | |
|---|---|---|
| 629,392 | 7/1899 | Protheroe et al. ............... 74/45 |
| 1,271,568 | 7/1918 | Hall . |
| 1,950,473 | 3/1934 | Brand ............................ 74/45 X |
| 2,055,396 | 9/1936 | Yoxall ........................... 74/45 X |
| 2,106,068 | 1/1938 | Sirch . |
| 2,491,548 | 12/1949 | Branson . |
| 3,613,465 | 10/1971 | Wood . |
| 4,475,374 | 10/1984 | Sakai et al. . |
| 4,702,428 | 10/1987 | Kempster . |
| 5,182,967 | 2/1993 | Yoshizawa et al. ............... 74/834 |

FOREIGN PATENT DOCUMENTS

| | | |
|---|---|---|
| 527863 | 4/1954 | France ............................ 74/44 |
| 1 812 081 | 4/1960 | Germany . |
| 1 175 053 | 7/1964 | Germany . |
| 42 00 707 | 7/1993 | Germany . |
| 52-19865 | 2/1977 | Japan . |
| 52-8466 | 3/1977 | Japan . |
| 53-19147 | 6/1978 | Japan . |
| 55-8767 | 2/1980 | Japan . |
| 57-192663 | 11/1982 | Japan . |
| 62-29156 | 6/1987 | Japan . |
| 629814 | 9/1949 | United Kingdom . |
| 1060298 | 3/1967 | United Kingdom . |

*Primary Examiner*—Allan D. Herrmann
*Attorney, Agent, or Firm*—Frishauf, Holtz, Goodman, Langer & Chick

[57] ABSTRACT

The apparatus comprises a lever member having a first regulator which is provided at an end of the lever member and functions as a force point, and a second regulator which is provided at another end of the lever member and functions as a movable fulcrum. An action point hole is provided between both of the ends of the lever member and is engaged with a crank pin of a crankshaft. The first regulator is connected with a piston as a reciprocal motion member, and the first and second regulators has a support member for movably supporting the force point and the movable fulcrum such that the force point and the fulcrum are movably in a lengthwise direction of the lever member.

4 Claims, 20 Drawing Sheets

|  | CONVENTIONAL ENGINE | INTERNAL FULCRUM Z-MECHANISM ENGINE | OTHER FULCRUM Z-ENGINE |
|---|---|---|---|
| INDICATED POWER (J) (PS) | 2358.0<br>80.17 | 2402.4<br>81.68 | 2402.4<br>81.68 |
| MECHANICAL LOSS — SIDE THRUST OUTPUT LOSS (J) | 438.0 | 207.8 | 66.0 |
| MECHANICAL LOSS — OTHER OUTPUT LOSS (J) | 77.35 | 77.35 | 77.35 |
| EFFECTIVE OUTPUT (J) (PS) (kgf.m) | 1842.7<br>62.65<br>14.96 | 2117.3<br>71.99<br>17.20 | 2259.1<br>76.81<br>18.34 |
| FLYWHEEL LOSS (J) (PS) | 17.43<br>0.59 | 0.0<br>0.0 | 0.0<br>0.0 |
| COUNTER-WEIGHT LOSS (PS) | 14.29<br>0.49 | 0.0<br>0.0 | 0.0<br>0.0 |
| ACTUAL EFFECTIVE OUTPUT (J) (PS) (kgf.m) | 1811.0<br>61.57<br>14.71 | 2117.3<br>71.99<br>17.20 | 2259.1<br>76.81<br>18.34 |
| INCREASE RATE OF ACTUAL EFECTIVE OUTPUT | 1.00<br>(0.80) | 1.17<br>(0.94) | 1.25<br>(1.00) |

FIG. 9

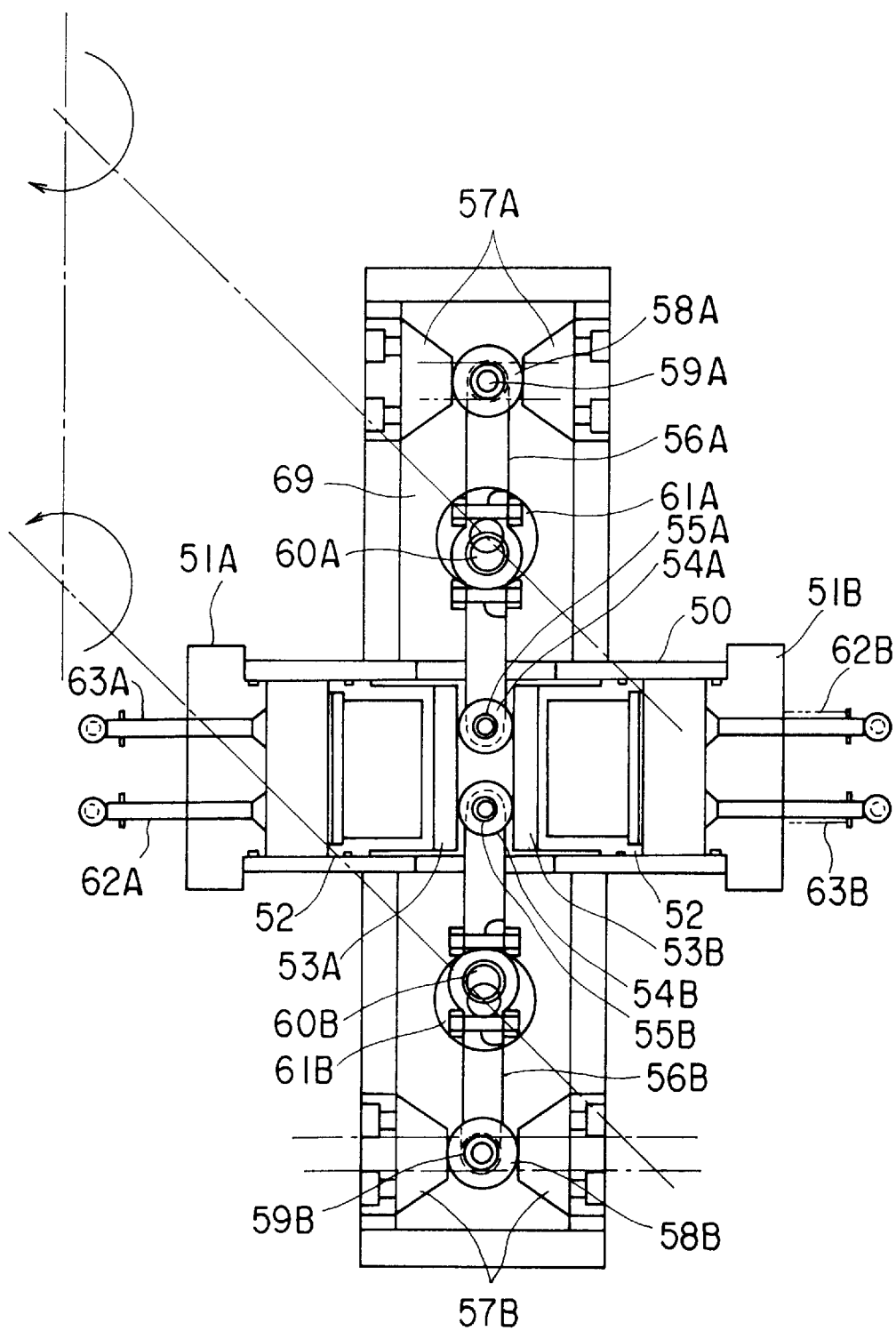
F I G. 16

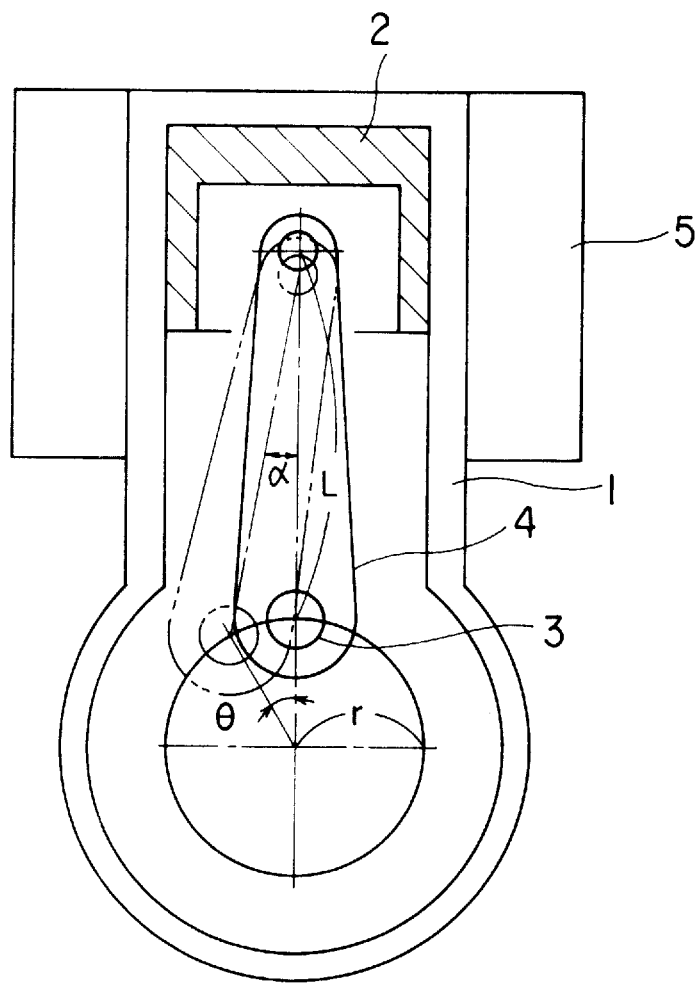
F I G. 24

APPARATUS FOR MUTUAL CONVERSION BETWEEN CIRCULAR MOTION AND RECIPROCAL MOTION

This application is a continuation of application Ser. No. 08/584,812, filed Jan. 11, 1996 now abandoned.

BACKGROUND OF THE INVENTION

1. Field of the Invention

The present invention relates to an apparatus for mutual conversion between circular motion and reciprocal motion which is used for converting reciprocal motion of, e.g., the piston of a four-cycle reciprocating engine into rotary motion of a crankshaft.

2. Description of the Related Art

FIG. 24 shows a cylinder section of a conventional four-cycle reciprocating engine. This engine has a structure in which a connecting rod 4 is connected between a piston 2 and a crankshaft 3, in order to convert reciprocal motion of the piston 2 moving up and down in the cylinder 1, into rotary motion of the crankshaft 3. In this figure, the reference numeral 5 denotes a radiating plate.

A known factor that hinders an increase in output efficiency of this kind of four-cycle reciprocating engine is a side thrust unnecessarily generated by the piston 2. This side thrust cannot be avoided since the piston 2 and the crankshaft 3 are coupled to each other by using the connecting rod 4. More specifically, since a friction heat is generated by the side thrust during process of the reciprocal motion of the piston 2, all the mechanical energy cannot be transmitted from the piston 2 to the crankshaft 3. The side thrust is also a factor which vibrates and shocks the piston 2.

Thus, conventionally, the connecting rod intervenes linear motion into rotary motion. However, since the piston oscillates as the crank moves, a side thrust is generated between the piston and the cylinder, e.g., in a four-cycle engine. Due to an energy loss thus caused by the side thrust, the engine idling speed must be increased to about 1,000 rpm, causing a problem in fuel consumption.

The side thrust causes not only the energy loss but also cracking and breaking of a piston through collision of the piston against side walls of the cylinder. In order to prevent these damages, the piston must be made of a heavy, strong metal, and as a result, the weight of the piston cannot be decreased by making the piston with, e.g., ceramics.

FIG. 5 shows a relationship between a piston position in a cylinder and an engine rotation angle in a conventional four-cycle reciprocating engine. In FIG. 5, a continuous line graphically shows an ideal displacement of a piston in a cylinder. Compared with this displacement, a piston of a conventional reciprocating engine moves as indicated by a broken line in the figure and shows that a pressure raising speed of a fuel gas is later than an ideal speed within a compression process from 0° to 180° while the lowering of the pressure of the fuel gas is earlier than the ideal speed within a process from 180° to 360°. For example, where ignition is obtained at a position of 160°, the compression ratio of a fuel gas of a conventional engine is smaller than the ideal compression ratio (which is called a late rise of a piston), and therefore, an expansion pressure is consequently decreased. Further, in the expansion process, the pressure of the combustion gas decreases earlier than the ideal pressure (which is called an early fall of the fuel piston), and the pressure generated by combustion of the fuel gas cannot sufficiently be converted into a mechanical energy.

FIG. 6 is a graph showing a relationship as a conversion efficiency between a gas volume V (m²) in a cylinder and a gas pressure MPa (in mega-pascal) in case where a combustion energy is converted into a mechanical energy. In this figure, a broken line indicates an energy efficiency of a conventional reciprocating engine and a solid line represents that of the present invention.

The late rise and early fall of a piston which reduce a heat efficiency of a reciprocating engine are called subtraction motion. Particularly, in engines for ships, the connecting rod is designed to be as long as possible in order to eliminate the subtraction motion and as a result, these engines sometimes have a height of 15 m.

FIG. 7 is a view analyzing operations of the piston 2, connecting rod 4, and the crankshaft 3 of FIG. 24, where s denotes the process of the piston 2, L denotes the length of the connecting rod 4, r denotes the rotation radius of the crankshaft 3, α denotes an angle between the connecting rod 4 and a line connecting centers of the piston 2 and the crankshaft 3 with each other, and θ denotes a rotation angle of the crankshaft 3.

The displacement of a piston of a conventional engine is represented by the following equation.

$$s = r(1-\cos\theta) + L(1-\cos\alpha)\ L\cdot\sin\alpha = r\cdot\sin\theta$$

This equation is developed as follows:

$$s = r(1-\cos\theta) + L(1-(1-r^{}2\sin^{}2\theta/L^{}2)^{}0.5) \tag{1}$$

where 2 denotes a square and 0.5 denotes a square root.

As can be seen from the equation (1), the displacement s of the piston includes a term of the 0.5th degrees in the rotation angle θ of the crankshaft 3. Therefore, the displacement s of the piston does not show a shape of an ideal sine wave.

Further, a conventional engine uses a flywheel and counter-weight for a crankshaft to smoothen engine rotation. These components, however, absorb an energy generated by the engine during engine acceleration, and the energy thus absorbed is then consumed as a wasteful thermal energy during braking for engine deceleration.

SUMMARY OF THE INVENTION

The present invention therefore has an object of providing an apparatus for mutual conversion between circular motion and reciprocal motion, which can decrease an energy loss caused when converting reciprocal motion of a piston of, e.g., a two- or four-cycle reciprocating engine, and the piston can be made of ceramics to reduce the engine weight.

According to an aspect of the present invention, an apparatus for mutual conversion between circular motion and reciprocal motion is provided which comprises: a lever member having a first regulator provided at an end of the lever member for functioning as a force point or an action point, a second regulator provided at another end of the lever member for functioning as a movable fulcrum, the lever member having a point functioning as an action point or a force point which is rotatably and axially mounted at a point on a line connecting a rotation center of a rotary member and a circumference thereof, characterized in that a reciprocal motion member is connected with the first regulator and that the first and second regulators have a support member for movably supporting the force or action point and the movable fulcrum such that the force or action point and the movable fulcrum are movable in a lengthwise direction of the lever member.

According to another aspect of the present invention, an apparatus for mutual conversion between circular motion and reciprocal motion is provided which comprises: a lever member having a first regulator provided at an end of the lever member for functioning as a force point or an action point, a second regulator provided at another end of the lever member for functioning as a movable fulcrum, the lever member having a point functioning as an action point or a force point which is rotatably and axially mounted at a point on a line connecting a rotation center of a rotary member and a circumference thereof, characterized in that the first and second regulators have a support member for movably supporting the force or action point and the movable fulcrum such that the force or action point and the movable fulcrum are movable in a lengthwise direction of the lever member.

According to a further aspect of the present invention, an apparatus for mutual conversion between circular motion and reciprocal motion is provided which comprises: a rotary member, a lever member having a first regulator provided at an end of the lever member for functioning as a force point or an action point, a second regulator provided at another end of the lever member for functioning as-a movable fulcrum, the lever member having a point functioning as an action point or a force point which is rotatably and axially mounted on a line connecting a rotation center of the rotary member and a circumference thereof characterized in that the first and second regulators have a support member for movably supporting the force or action point and the movable fulcrum such that the force or action point and the movable fulcrum are movable in a lengthwise direction of the lever member.

According to a still further aspect of the present invention, an apparatus for mutual conversion between circular motion and reciprocal motion is provided which comprises: a lever member having a first regulator provided at an end of the lever member for functioning as a force point, a second regulator provided at another end of the lever member for functioning as a movable fulcrum, the lever member having a point functioning as an action point which is rotatably and axially mounted on a line connecting a rotation center of a rotary member and a circumference thereof; and a rotary motor having an output shaft connected with the force point, characterized in that the first regulator is connected with a reciprocal motion member as a reciprocal moved member and that the first and second regulators have a support member for movably supporting the action point and the movable fulcrum such that the action point and the movable fulcrum are movable in a lengthwise direction of the lever member.

According to another aspect of the present invention, an apparatus for mutual conversion between circular motion and reciprocal motion is provided which comprises: a lever member having a first regulator provided at an end of the lever member for functioning as a force point or an action point, a second regulator provided at another end of the lever member for functioning as a movable fulcrum, the lever member having an intermediate point functioning as an action point which is rotatably and axially mounted on a line connecting a rotation center of a rotary member and a circumference thereof, characterized in that the first regulator is connected with a piston of a reciprocal motor having a cylinder, that the piston is movably included in the cylinder, that the cylinder has ends both respectively provided with a gas intake device and a gas exhaust device, and that the first and second regulators have a support member for movably supporting the force point and the movable fulcrum such that the force point and the movable fulcrum are movable in a lengthwise direction of the lever member.

In the present invention, a first regulator is provided at an end of a lever member having an intermediate point which is rotatably and axially mounted on a line connecting a rotation center of a rotary member and a circumference thereof. A second regulator functioning as a movable fulcrum is provided at an another end of the lever member. The first regulator is connected with a reciprocal motion member. The lever member is supported at the force point or the action point and the movable fulcrum by the first and second regulators such that the lever member is movable in its lengthwise direction.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 9 is a table comparing characteristics of a conventional reciprocating engine, those of a movable inner fulcrum type Z-mechanism engine of a prior application, and those of a movable outer fulcrum type Z-mechanism engine of the present invention with each other;

FIG. 16 is a front view showing a cross-section of a movable outer fulcrum type Z-mechanism engine according to a further embodiment of the present invention;

FIG. 24 is a view schematically showing a conventional reciprocating engine.

DETAILED DESCRIPTION OF THE PREFERRED EMBODIMENTS

In the following, embodiments of the present invention will be specifically described with reference to the drawings.

Figure 1:
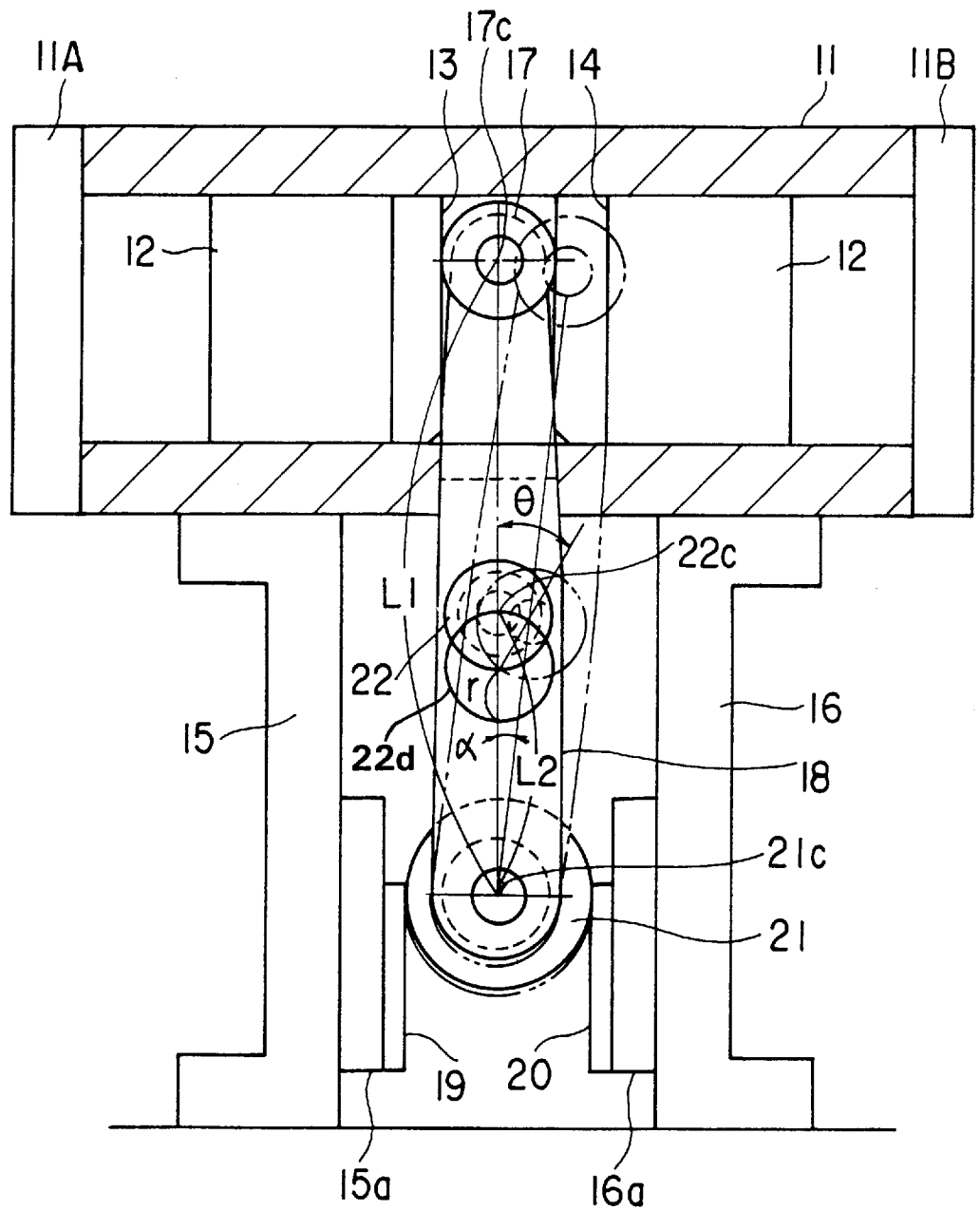
FIG. 1 is a side view showing a partial cross-section of a structure according to an embodiment of the present invention.

FIG. 1 is a cross-section showing the entire structure of an embodiment of the present invention. This embodiment is a four-cycle engine having a structure in which a columnar piston 12 is provided in a cylinder 11 placed in a horizontally position, and vertically opposing wall surface members 13 and 14 are formed in a notch portion in a central position of the piston 12. Cylinder heads 11A and 11B are respectively provided at both ends of the cylinder 11, and the cylinder 11 is equipped with an ignition plug and intake and exhaust valves which are not shown in the figure. Piston rings not shown are provided at an outer wall near both ends of the piston 12, thereby to ensure sealing between the inner wall of the cylinder 11 and the piston 12.

A rotation roller 17 is inserted between the vertically opposite wall surfaces of the members 13 and 14 and the roller 17 has a diameter substantially equal to the distance between the wall surfaces of the members 13 and 14. The roller 17 is rotatably supported by an upper end of a lever member 18 which functions as a force point of this member 18 projecting downwardly from between the wall surfaces of the members 13 and 14. The wall surfaces of the members 13 and 14 function as a force point regulator for retaining the force point of the lever member 18 by the roller 17 such that the force point can freely move in the lengthwise direction of the lever member 18.

The cylinder 11 is supported at its lower portion by a pair of support frames 15 and 16. Guide plates 19 and 20 are mounted on internally opposing wall surfaces of these support frames 15 and 16 with spacers 15a and 16a inserted therebetween. A rotation roller 21 rotatably supported at a lower end of the lever member 18 is inserted between the guide plates 19 and 20. The lower end of the lever member 18 functions as a fulcrum and is supported between the guide plates 19 and 20 such that the fulcrum can freely move in the lengthwise direction of the lever member 18. Therefore, this fulcrum is referred to as a movable fulcrum and the guide plates 19 and 20 are referred to as a movable fulcrum regulator.

An intermediate point of the lever member 18 is rotatably connected as an action point with a crankshaft 22. Therefore, when the upper end of the lever member 18 is driven in the right and left directions by the piston 12, the lever member 18 is swung about the center of the roller 21 as a fulcrum in the clockwise and counterclockwise directions. In this state, the rollers 17 and 21 respectively guide the lever member 18 in the lengthwise direction thereof between the guide members 13 and 14 and between the guide plates 19 and 20 to let the crankshaft 22 rotate. As a result of this, the upper end of the lever member 18 is oscillated by reciprocal linear motion of the piston 12 through the roller 17, and this reciprocal motion is converted by the crankshaft 22 into rotation motion with excellent smoothness.

Specifically, a side thrust generated between the piston 12 and the inner wall of the cylinder 11 by the reciprocal motion of the piston 12 in the right and left directions is absorbed by rotation of each of the roller 17 and 21, and mechanical losses caused by the side thrust are extremely low.

In an engine according to this embodiment, it is possible to maintain stable rotation of the crankshaft 22 at a lower speed of 100 rpm or lower, while the crankshaft 22 need not be equipped with a counter balance nor a flywheel. Therefore, energy losses are not involved during acceleration or deceleration if the engine is mounted on a car, and the axial output efficiency is thus remarkably improved.

Figure 2:
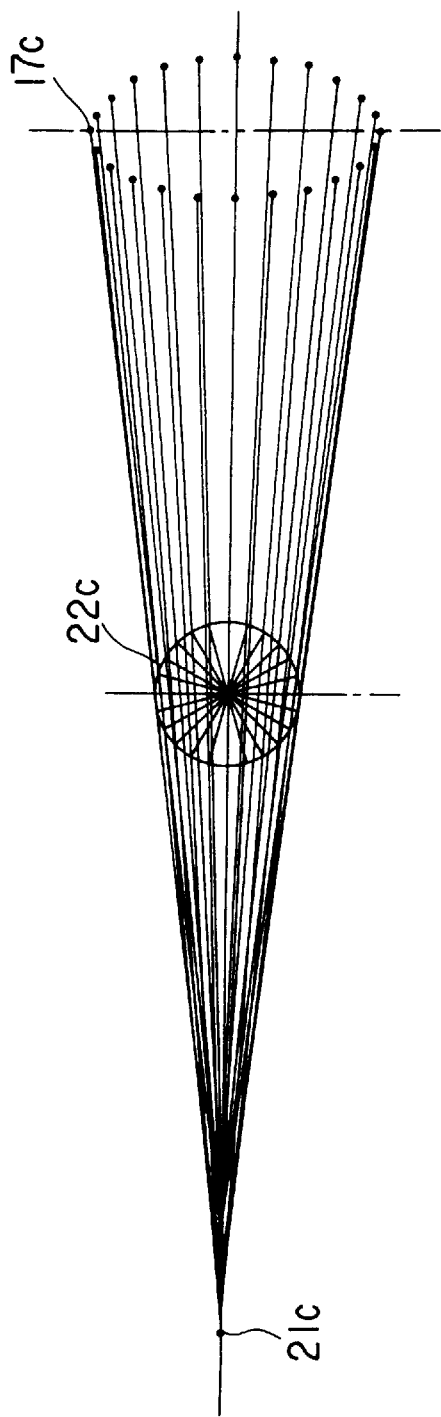
FIG. 2 is a view of a locus or an operational trace for explaining operations of respective sections of the embodiment shown in FIG. 1.
Figure 3:
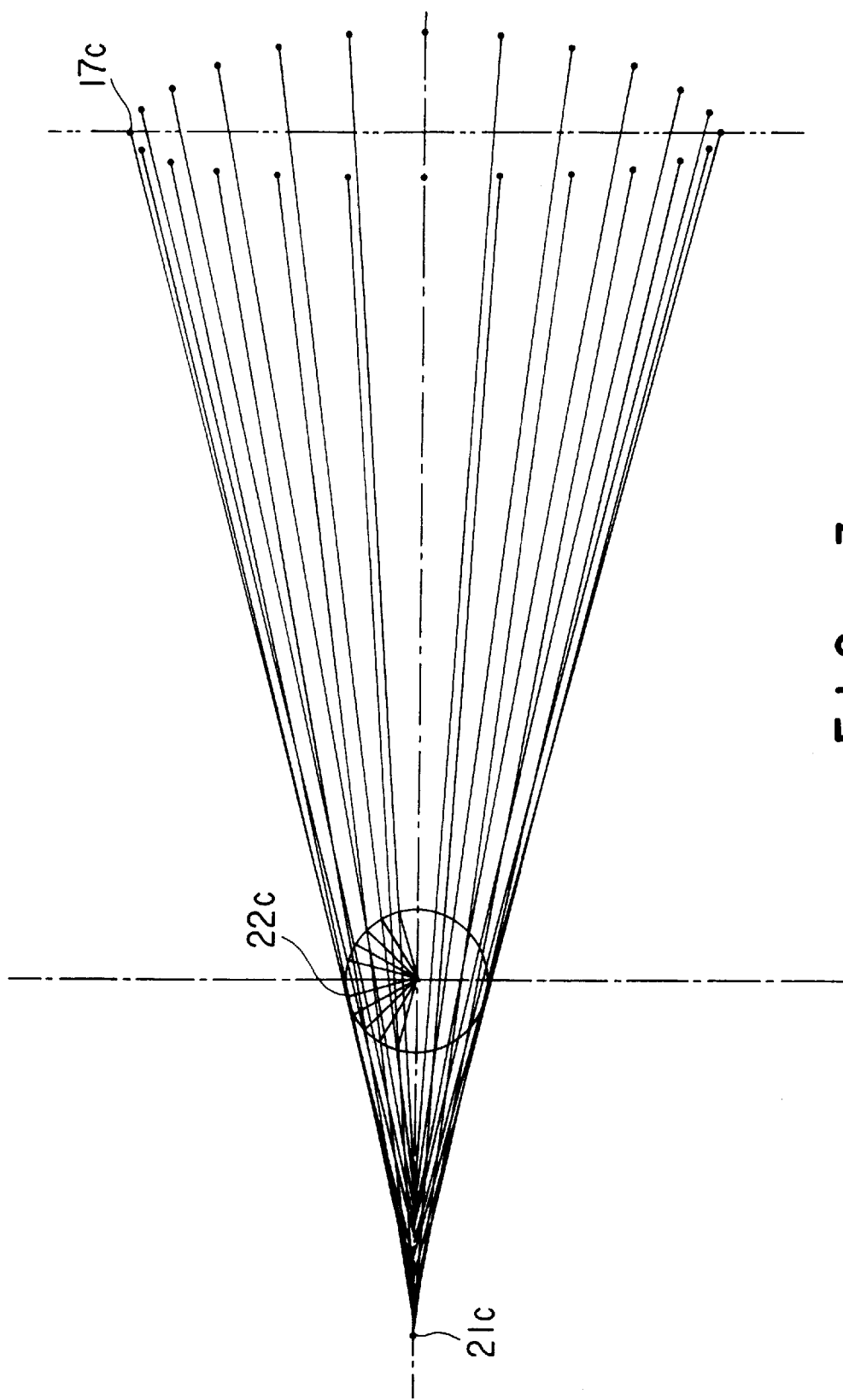
FIG. 3 is a view of operational traces for explaining operations of respective sections of a modification of the embodiment shown in FIG. 1.
Figure 4:
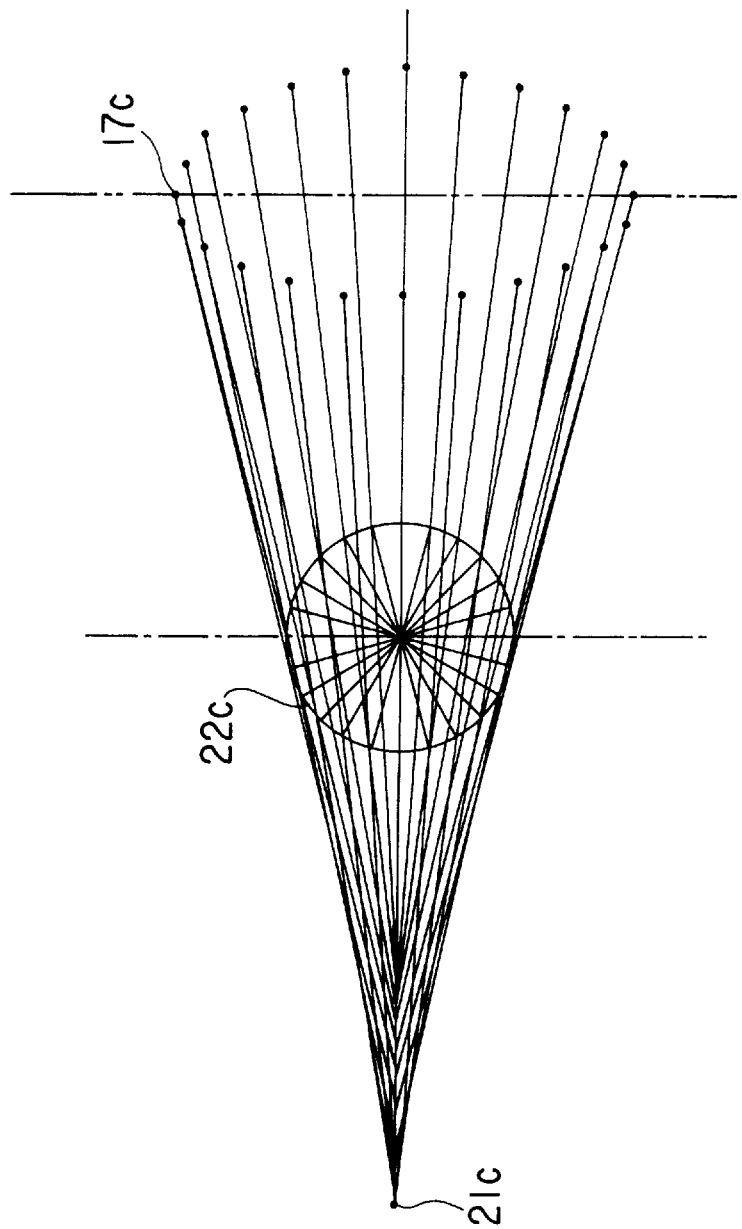
FIG. 4 is a view of operational traces for explaining operations of respective sections of a further modification of the embodiment shown in FIG. 1.
Figure 8:
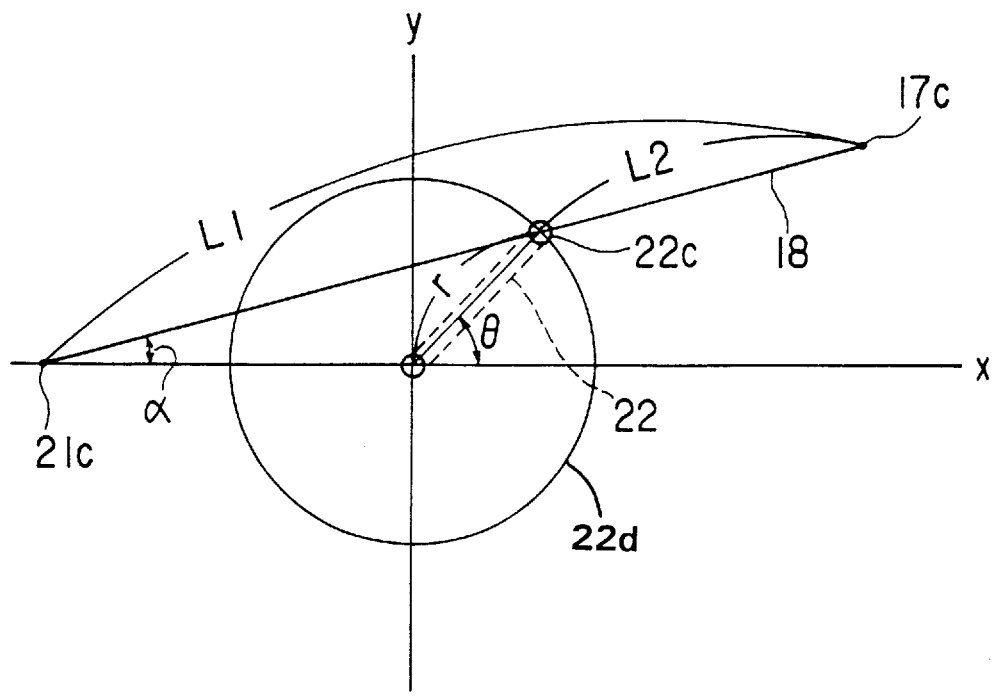
FIG. 8 is a diagram showing a piston, a movable outer fulcrum type lever device, and a crankshaft in the embodiment of FIG. 1.

FIGS. 2, 3, and 4 respectively show motion traces of the rotation center 17c of the rotation roller 17 as a force point of the lever member 18, the rotation center 21c of the rotation roller 21 as a fulcrum, and a connection point 22c of the crankshaft 22 as an action point, in the embodiment of FIG. 1. The connection point 22c moves along a locus 22d as shown in FIGS. 1 and 8. FIGS. 2 and 4 show examples in which the ratio of the distance between the fulcrum 21c and the force point 17c to the distance between the fulcrum 21c and the action point 22c is 2:1, respectively. FIG. 3 shows an example in which the ratio of the distance between the fulcrum 21c and the force point 17c to the distance between the fulcrum 21c and the action point 22c is 4:1. As seen from these views, the action point 22c moves on an absolute circle in accordance with an oblate circular movement of the force point 17c, while the movable fulcrum 21c achieves linear reciprocal motion along the lengthwise direction of the lever member 18.

Figure 5:
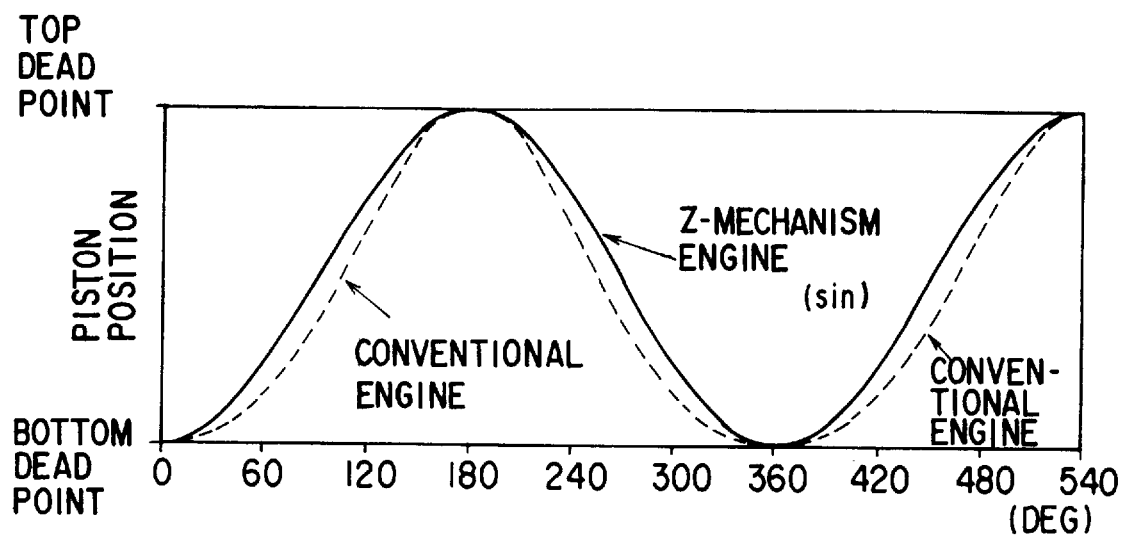
FIG. 5 is a graph showing a relationship of a piston position and a rotation angle of a crankshaft according to the embodiment of FIG. 1, compared with a conventional example.
Figure 6:
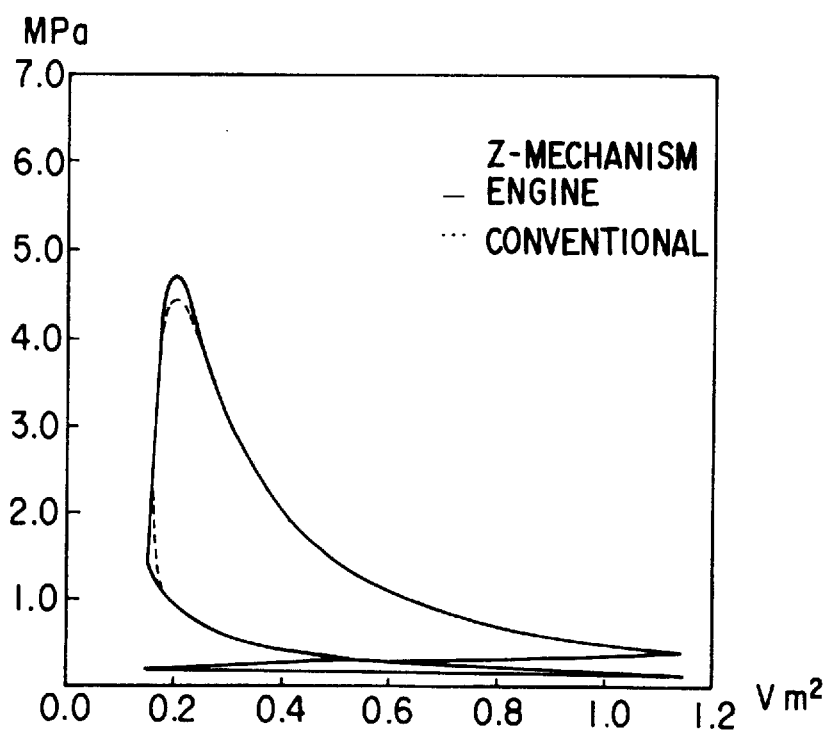
FIG. 6 is a graph showing a relationship between a gas volume and a pressure in a cylinder according to the embodiment of FIG. 1 compared with a conventional apparatus.
Figure 7:
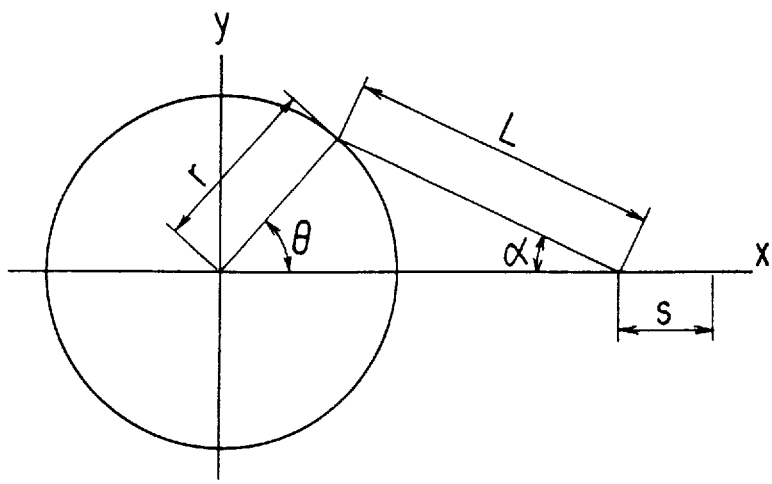
FIG. 7 is a diagram showing a relationship between a piston, a connecting rod, and a crankshaft in a conventional reciprocating engine.

FIG. 5 is a graph which shows a solid or continuous line indicating a relationship between the piston displacement and the engine rotation angle, in the embodiment shown in FIG. 1. This relationship shown by the solid line forms an absolute sine curve. Therefore, the piston is in an ideal piston position at an ignition point during the compression process from 0° to 180°, so that ignition is preformed with a fuel gas being sufficiently compressed, thereby generating a maximum combustion pressure. On the other hand, a rapid displacement of the piston 12 is prevented during the expansion process following 180°, so that the combustion pressure is transmitted to the piston 12 with the highest efficiency and is efficiently converted into a mechanical energy. This state is also indicated by a continuous line in FIG. 6. This figure apparently shows that the maximum combustion pressure is generated since ignition is performed with a fuel gas being sufficiently compressed in the present invention, compared with a prior art shown by dashed lines.

Next, specific explanation will be made to phases in which the piston 12 of the embodiment shown in FIG. 1 moves with displacements forming an absolute sine curve, with reference to FIG. 8.

FIG. 8 helps analyzation of operations of the piston 12, lever member 18, and the crankshaft 22 shown in FIG. 1. In FIG. 8, x denotes a displacement in the lengthwise direction of the lever member 18, y denotes a displacement of the piston 12 within the cylinder 11, L1 denotes distance between the action point 22c and the rotation center 21c of the rotation roller 21 as the movable fulcrum of the lever member 18, L2 denotes a distance between the force point 17c and the action point 22c connected with the crankshaft 22, r denotes a rotation radius of the crankshaft 22, α denotes an angle between the lever member 18 and the crankshaft 22, and θ denotes a rotation angle of the crankshaft 22.

More specifically, the displacement y of the piston 12 of the embodiment shown in FIG. 1 is expressed by the following equation:

$$y = L1 \sin \alpha \qquad (2)$$

Here, the following equation exists:

$$r \sin \theta = (L1 - L2) \sin \alpha$$

Therefore, the following is obtained.

$$\sin \alpha = r(L1 - L2) \sin \theta \qquad (3)$$

The equation (2) is substituted into the equation (3) as follows:

$$y = L1 \{ r(L1 - L2) \} \sin \theta$$

The displacement of the piston 12 is accordingly expressed as follows:

$$y = \{ L1/(L1 - L2) \} r \sin \theta \qquad (4)$$

As is apparent from the equation (4), this equation is expressed only by linear terms of θ, and therefore, forms an absolute sine curve as indicated by the continuous line in FIG. 5. Thus, the displacement of the piston 12 is an ideal one so that a heat energy generated within the cylinder 11 is efficiently extracted therefrom in the form of a mechanical energy. Furthermore, if another engine which has the same structure as shown in FIG. 1 is connected to the crankshaft 22 with a phase difference of 18° and two pistons are driven and displaced with the phase difference of 180° maintained, both the vibrations generated by the pistons cancel each other and the engines can thus constitute a noiseless engine unit.

FIG. 9 is a table comparing the engine characteristics of 2000CC- and 4000CC-four-cylinder engines in each of which a lever member having an outer fulcrum constituted by application of the present invention is used as a power transmission mechanism from the piston to the crankshaft, with the engine characteristics of an engine using a conventional connecting rod and those of an engine using, as a power transmission mechanism, a lever member having an internal fulcrum according to a prior application (Japanese Patent Application No. 6-49506) of the present inventor. Note that data in the table are characteristics under condition where each engine has a stroke of 86 mm and a bore diameter of 86 mm and is operated at 3000 rpm. To simplify the following explanation, the engines with the above lever mechanisms will be referred to as an internal fulcrum type Z-mechanism engine and outer fulcrum type Z-mechanism engines.

As is apparent from FIG. 9, an output loss due to side thrusts of pistons in a conventional engine reaches about 19% of the indicated power, while that of the internal fulcrum type Z-engine of the preceding application is about 8.6% which is reduced to about half of the output loss of the conventional engine. In the outer fulcrum type Z-engine according to the present invention, the output loss is remarkably low, i.e., 2.7%. The "indicated power" means a workload decided by subtracting an exhaust loss and a heat loss from a combustion output. In the outer fulcrum type Z-engine of the present invention, since the displacement of the force point by which the piston is driven to move is small while the piston is moving, the moment by which the piston is rotated is small and the friction coefficient is small so that the side thrust is reduced to be extremely small.

As is also apparent from the top column of FIG. 9, the indicated power of the conventional engine is smaller than those of the internal and outer fulcrum type Z-mechanical engines, because of "a late rise and an early fall" of the piston which has been explained beforehand.

A side thrust workload means a balance between respective pistons, and is obtained by integration from 0° to 720° a side thrust force and by multiplying the integrated side thrust force by a friction coefficient. Conditions are determined as follows:

Friction coefficients:

conventional engine . . . 0.366 internal support point Z-engine . . . 0.340 outer support point Z-engine . . . 0.166

The friction coefficients are determined on the basis of a mechanical engineering handbook. Although these friction coefficients vary depending on surface pressures of pistons on the inside wall of the cylinder, the above coefficients are determined since a piston normally presses a cylinder wall with an average pressure of about 30.2 kg/cm² in a conventional engine, with an average pressure of about 18.9 kg/cm² in an internal fulcrum type Z-engine, and with an average pressure of about 7.1 kg/cm² in an outer fulcrum type Z-engine.

Also, a conventional engine causes a loss of total 2% or so due to use of a flywheel and a counter-weight as has been explained beforehand, while an engine using a lever member as a moving power transmission mechanism involves no loss.

In a conventional engine, a workload shown in the figure is normally said to be about 38% of the total heat generation workload of a fuel. This is evaluated as 80.17 PS from calculation as shown in FIG. 9. An effective workload (i.e., an axial workload) is obtained by subtracting a mechanical loss from the workload shown in the figure. Where the workload due to a side thrust is estimated to be 85% of a mechanical loss, the mechanical loss is 17.25 PS. This mechanical loss is subtracted from the workload shown in the figure, thereby obtaining an effective workload of 62.7 PS from calculation. Calculation is made supposing that the mechanical loss of an outer fulcrum type Z-mechanism engine excluding a side thrust workload is equal to that of a conventional engine.

A side thrust loss output (J) is especially remarkable in FIG. 9. This output is 66.0 in the present invention which is apparently reduced to 15% in comparison with a conventional engine. In comparison with an internal fulcrum type Z-mechanism engine according to the preceding application, the side thrust output loss is reduced to about ⅓. Although various attempts have been made to reduce side thrusts in the history of developments of engines, none of those attempts reaches a remarkable reduction as in the present invention.

As a result, output increasing ratios of effective outputs are 1.17 in the internal fulcrum type Z-mechanism engine using a lever member according to the preceding application and 1.25 in the outer fulcrum type Z-mechanism engine using a lever member having an outer fulcrum of the present invention, with respect to the effective output of a conventional engine as a reference of 1.00. Thus, the present invention achieves an increase of 25% compared with a conventional engine.

Further, the weight of an outer fulcrum type Z-mechanism engine according to the present invention is estimated as 111.8 kgf, where this engine is a 2000 cc four-cylinder engine. On the other hand, a conventional engine has a weight of 149.0 kgf. Therefore, the weight is reduced by 33.0%. The engine of the present invention has a schematic size of 685.0×610.0×615.0 which is much more compact than that of the conventional engine of 450×550.0×420.0.

The outer fulcrum type Z-mechanism engine according to the present invention attains an output (per weight) of 1.47 PS/kgf at a rotation speed of 6500 rpm, while the conventional engine attains an output (per weight) of only 0.97 PS/kgf at a rotation speed of 6500 rpm.

In addition, the apparatus according to the embodiment shown in FIG. 1 has a reversible mechanism, and can be used as a pump for compressing and feeding a liquid or a gas if an electric motor not shown is connected with the crankshaft 22 so as to rotate and drive this crankshaft thereby reciprocally driving the piston 12 within the cylinder 11.

In this case, a side thrust generated in accordance with reciprocal motion of the piston 12 is absorbed as rotations of rollers 17 and 21, and these components cause extremely low mechanical losses.

Figure 10:
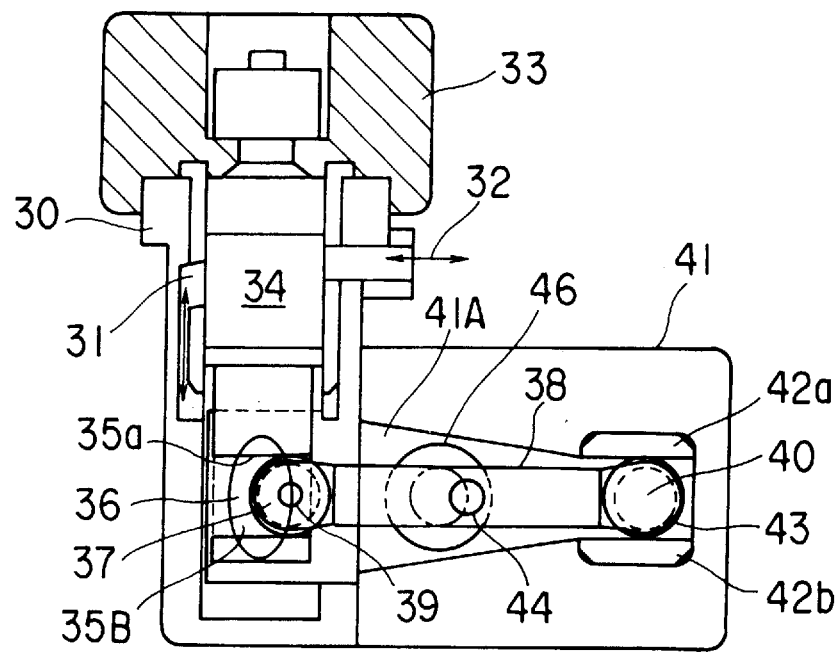
FIG. 10 is a front view showing a cross-section of a movable outer fulcrum type Z-mechanism engine according to another embodiment of the present invention.
Figure 11:
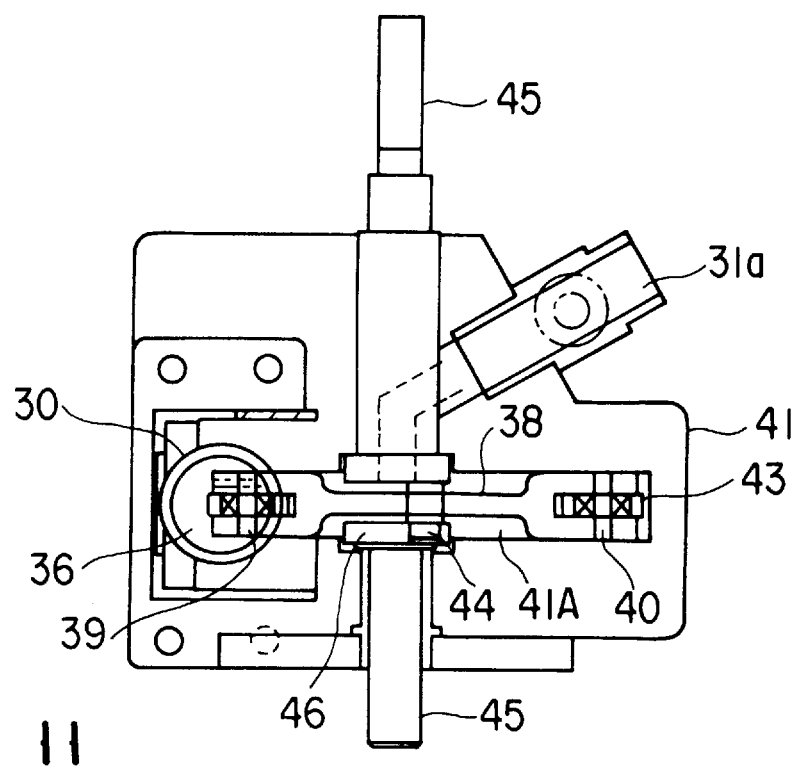
FIG. 11 is a top view showing a cross-section of the movable outer fulcrum type Z-mechanism engine according to the embodiment of FIG. 10.
Figure 12:
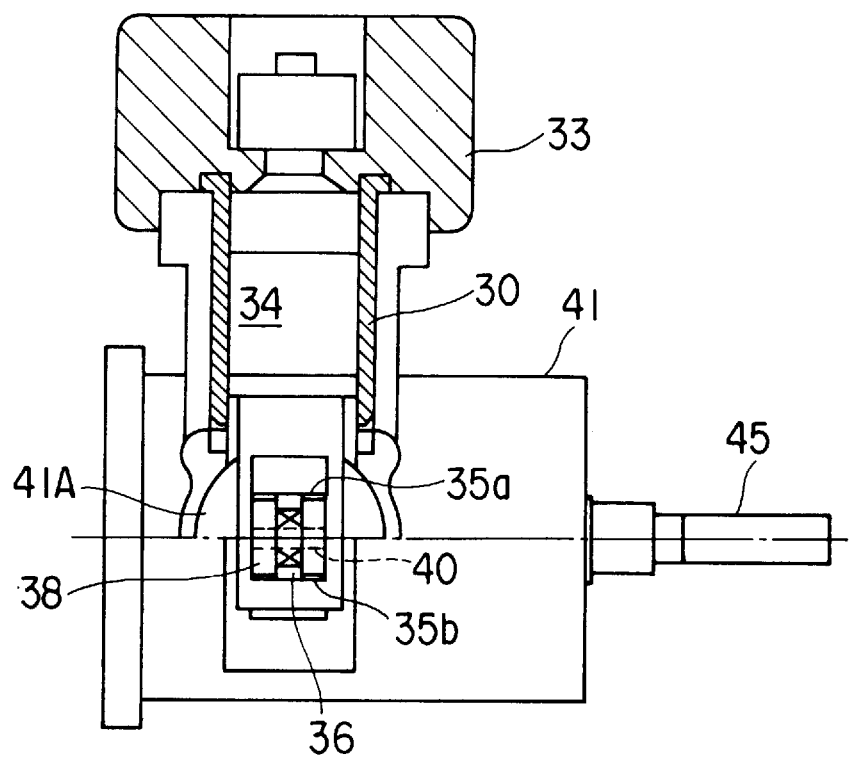
FIG. 12 is a side view showing a cross-section of the movable outer fulcrum type Z-mechanism engine according to the embodiment of FIG. 10.

FIGS. 10, 11, and 12 are views schematically showing the structure of an embodiment in which the present invention is adopted to a two-cycle engine, and are cross-sections in a front view, a top view, and a side view, respectively. In FIGS. 10 to 12, an inlet port 31 and an outlet port 32 are provided at an upper portion of a cylinder 30 of a two-cycle engine. A cylinder head 33 is provided at a top end of the cylinder 30. The inlet port 31 is connected to a carburetor 31a secured to an engine block 41 through a crank chamber 41A formed in the engine block 41. Lubrication oil is supplied to a piston 34 and a lever member 38 together with petrol, by injecting a mixed gas of petrol and lubrication oil from the carburetor 31a.

A piston 34 is inserted in the cylinder 30. This piston 34 is provided with a notch portion 36 in which guide walls 35a and 35b are formed so as to extend in a direction perpendicular to the center axis of the piston 34. A rotation roller 37 is inserted between the guide plates 35a and 35b in a direction perpendicular to the center axis of the piston 34 such that the rotation roller 37 is rotatable, and this rotation roller 37 is rotatably secured to a force point 39 of the lever member 38. These guide plates 35a and 35b together with the rotation roller 37 function as a movable force point regulator.

Another end of the lever member 38 is a fulcrum 40 to which a rotation shaft of a rotation roller 43 is secured, and the rotation roller 43 is rotatably inserted between guide plates 42a and 42b fixed to the engine block 41. These guide plates 42a and 42b together with the rotation roller 43 function as a movable fulcrum regulator.

A pin 44 used as an action point is fixed between the force point 39 and the fulcrum 40 of the lever member 38. The pin 44 is engaged with an eccentric disc 46 which has a crank hole formed to be deviated from a rotation main shaft 45.

The piston 34 is provided in a cylinder 30 and moves up and down along the inner wall of the cylinder 30. A sealing ring is provided on a circumference of the piston 34, thereby to ensure sealing with respect to a mixture of petrol and oil.

In the embodiment shown in FIGS. 10 to 12, the lever member 38 is supported by a movable fulcrum regulator having the same structure as in the embodiment shown in FIG. 1, and the action point of the lever member 38 is rotatably connected to the crank hole of the eccentric disc 46 by the pin 44.

More specifically, in the two-cycle engine of this embodiment, when a mixture gas taken in through the carburetor 31a is compressed and ignited by an ignition plug not shown in the vicinity of a top dead point of the piston in the intake and compression process, the combustion gas expands thereby pressing down the piston 34. This motion of the piston 34 is transmitted through the roller 37 to a lever member 38 having an outer fulcrum, and is then transmitted through the pin 44 to the eccentric disc 46 which converts the motion into rotary motion and transmits the motion to the rotation main shaft 45.

In the embodiment of FIGS. 10 to 12, when the piston 34 is pressed against the inner wall of the cylinder 30 by an expansion pressure of the combustion gas, the piston 34 does not generate a thrust force to the cylinder 30, which will otherwise be caused by a reaction from the lever member 38, since the piston 34 and the lever member 38 are connected with each other by the movable force point regulator consisting of the guide walls 35a and 35b and the rotation roller 37. As a result, an energy loss caused by a side thrust is greatly reduced in comparison with a conventional engine. In the same way, the movable fulcrum of the lever member 38 is supported by the guide plates 42a and 42b and the rotation roller 43 which are combined together to operate as a movable fulcrum regulator. Therefore, reciprocal motion of the piston 34 is converted into rotary motion with less losses.

In this case, since the piston 34 is not pressed against the inner wall of the cylinder 30 with a strong pressure, the main part of the piston 34 may be formed of ceramics. Further, since the side thrust is small, energy losses are reduced so that the idling speed can be set to 50 rpm or less which leads to advantages in view of fuel consumption.

If a reciprocating engine can thus be formed of ceramics, the inner temperature of the cylinder 30 can be set to a value two or three times higher than a conventional engine. Although it is known that a conventional reciprocating engine attains only a heat efficiency of 20% due to the mechanical loss including the piston side thrust, this embodiment can lead to a great reduction in mechanical loss. For example, supposing that a mechanical loss is recovered by 10%, a high heat efficiency of 50% or more can be attained if the remaining heat loss of 70% is reduced to one third, i.e., 10% plus 70/3% plus 20%.

Figure 13:
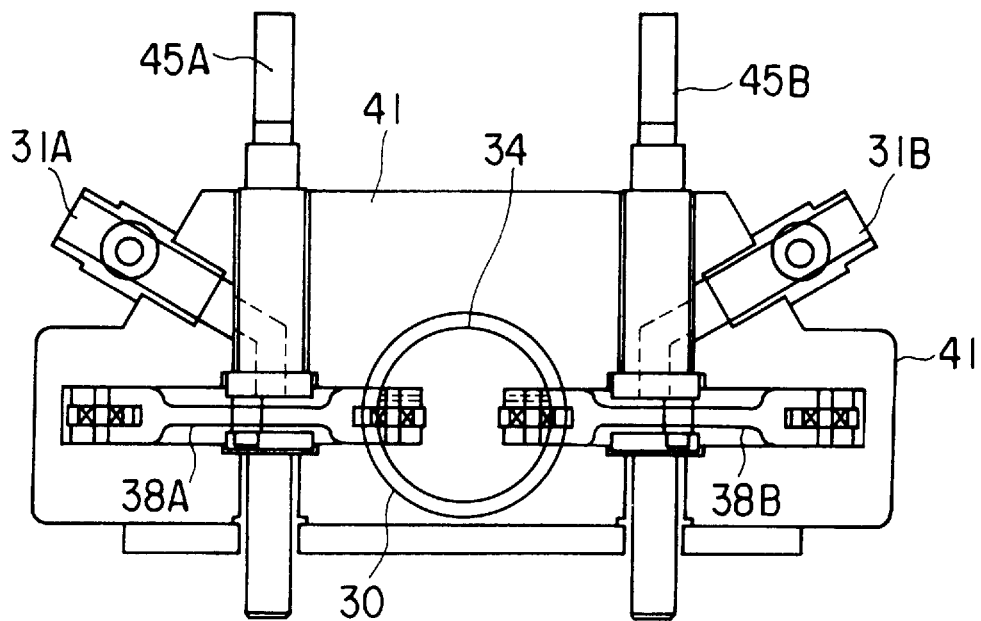
FIG. 13 is a front view showing a cross-section of a movable outer fulcrum type Z-mechanism engine according to another embodiment of the present invention.
Figure 14:
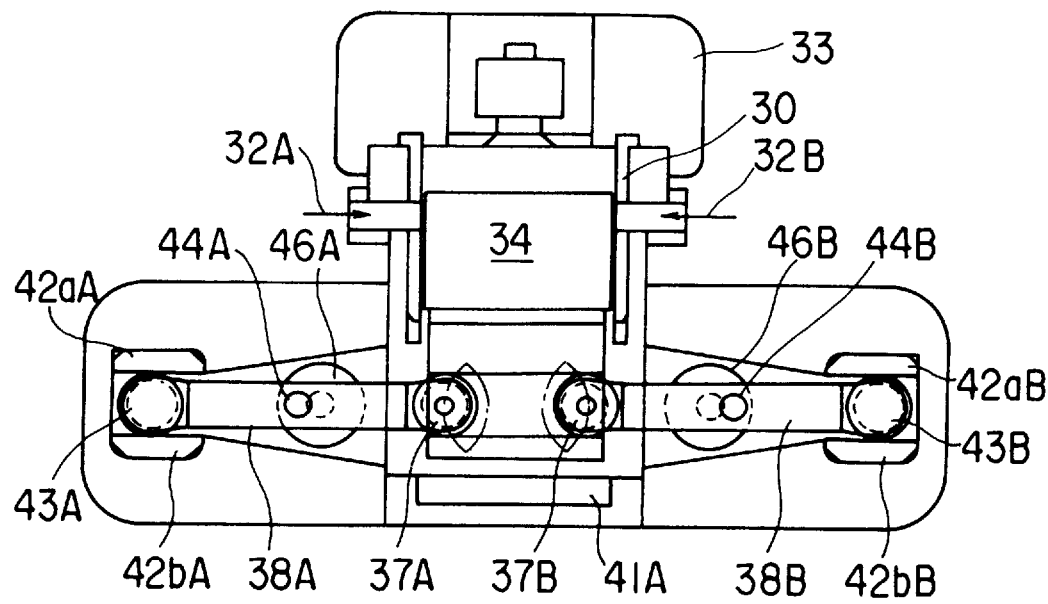
FIG. 14 is a top view showing a cross-section of the movable outer fulcrum type Z-mechanism engine according to the embodiment of FIG. 13.
Figure 15:
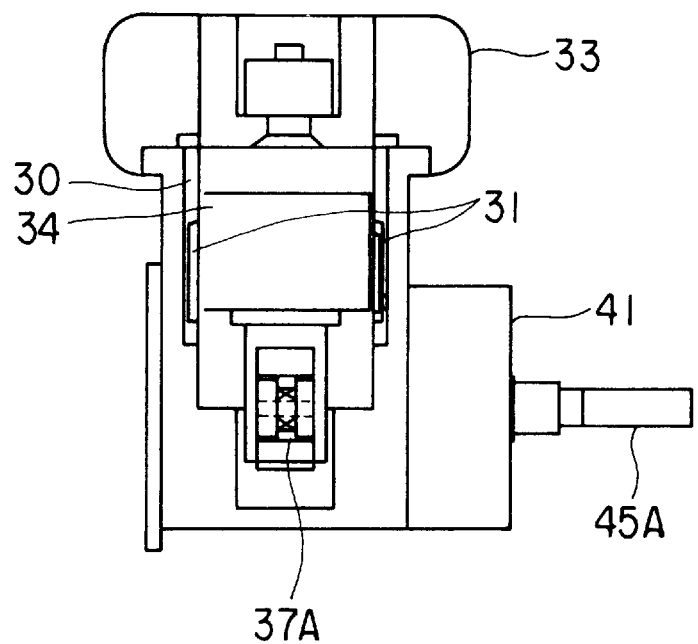
FIG. 15 is a side view showing a cross-section of the movable outer fulcrum type Z-mechanism engine according to the embodiment of FIG. 13.

FIGS. 13, 14, and 15 show an embodiment which uses a cylinder 30 and a piston 34 and is provided with lever members 38A and 38B in connection with the piston 34.

Those components of FIGS. 13 to 15 which correspond to the components of embodiment shown in FIGS. 10 to 12 are referred to by common reference numerals, and explanation of those components will be omitted or only briefly made in the following.

In the embodiment shown in FIGS. 13 to 15, one or both of the rotation main shafts 45A and 45B are rotated by a starter motor (not shown) so that, for example, the piston 34 moves in the cylinder 30 to the vicinity of the top dead end shown in the figure whereby a mixed fuel gas is compressed. In this state, when the mixed fuel gas is ignited by an ignition plug not shown, the piston is pressed by the combustion gas in the downward direction in the cylinder 30 and the lever members 38A and 38B are respectively swung in the clockwise and counter-clockwise directions by the rotation rollers 37A and 37B of force point regulators, with components 42aA, 42bA, and 43A as well as components 42aB, 42bB, and 43B being positioned as movable fulcrums. The components 42aA, 42bA and 43A constitute a movable fulcrum regulator while the components 42aB, 42bB and 43B also constitute another movable fulcrum regulator. As the lever members 38A and 38B are swung in the directions as stated above, the rotation main shafts 45A and 45B are respectively rotated in the counter-clockwise and clockwise directions by pins 44A and 44B. As a result, the piston 34 moves in the cylinder 30 to the vicinity of the bottom dead end in the figures, whereby exhausting process is completed and a primary compression of an intake gas is simultaneously carried out in the crank chamber 41A. While this process is repeatedly performed, the two-cycle engine comes to maintain continuous rotation by itself without help of the starter motor. Consequently, two outputs in form of rotation in opposite directions can be obtained through two rotation main shafts 45A and 45B, from one single cylinder 30 and one single piston 34.

FIG. 16 shows an embodiment of a four-cycle engine of a horizontal coaxial type in which cylinder heads 51A and 51B are respectively provided at both ends of one cylinder 50 placed in a horizontal position such that the heads 51A and 51B face each other, and in which one single piton 52 is driven to reciprocate between the cylinder heads 51A and 51B. In FIG. 16, two rotation rollers 54A and 54B are inserted between a pair of guide plates 53A and 53B provided in the piston 52 which is inserted in the cylinder 50. These rollers 54A and 54B are respectively secured to the ends of lever members 56A and 56B which function as force points.

The lever member 56A has another end which is supported by a movable fulcrum regulator including a rotation roller 58A inserted between a pair of guide members 57A and of a pin 59A connecting the lever member and the roller 58A. The lever member 56A is connected at its intermediate point with a crankshaft 61A by a pin 60A.

The lever member 56B has another end which is supported by a movable fulcrum regulator having a rotation roller 58B inserted between a pair of guide members 57B and of a pin 60B connecting the lever member 56B and the roller 58B. The lever member 56B is connected at its intermediate point with a crankshaft 61B by a pin 60B.

The crankshafts 61A and 61b connected to the lever members 56A and 56b contained in the crank chamber 69 are connected with camshafts, for example, through a belt and a roller not shown, thereby to drive cams installed on the camshafts. The cams drive intake valves 62A and 62B as well as exhaust valves 63A and 63B provided on the cylinder heads 51A and 51B, respectively, at predetermined timings, thereby to achieve four processes of a four-cycle engine, i.e., expansion, exhausting, intake, and compression. As a result, horizontal synchronized reverse rotation twin outputs are obtained from the crankshafts 61A and 61B, as indicated by arrows in FIG. 16.

The engine shown in FIG. 16 is basically the same as that shown in FIG. 10, and therefore, explanation to operation of the engine of FIG. 16 will be omitted herefrom. However, the engine of FIG. 16 can be rotated at a higher speed if a structure similar to the lever members 56A and 56B respectively provided between the piston 52 and the crankshafts 61A and 61B is used as drive mechanisms for intake valves 62A and 62B as well as the exhaust valves 63A and 63B.

Figure 17:
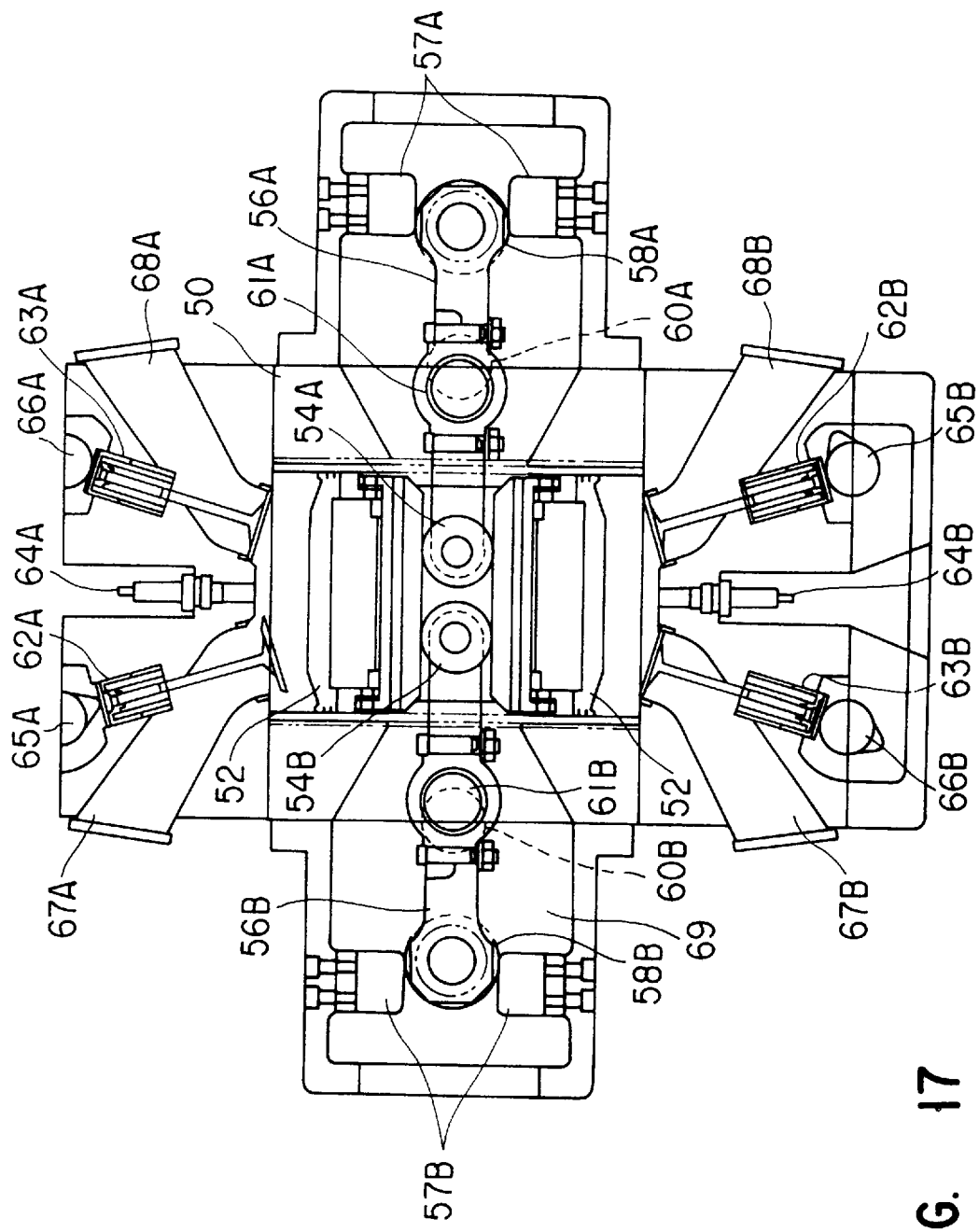
FIG. 17 is a front view showing a cross-section of a practical form of the embodiment of FIG. 10.

FIG. 17 shows an embodiment having a structure which is substantially the same as that of the embodiment shown in FIG. 16. However, the embodiment of FIG. 17 adopts a lay-out which is much more suitable for practical production and is also more compact than that of FIG. 16. Further, the embodiment of FIG. 17 differs from that of FIG. 16 in that FIG. 17 reveals ignition plugs 64A and 64B (not shown in FIG. 16), that cams 65A, 66A, 65B and 66B for driving valves are included, and that exhaust ports 67A and 67B as well as intake ports 68A and 68B are specifically illustrated. The other components of FIG. 17 will be referred to by the same references as those in FIG. 16, and explanation thereof will be omitted herefrom.

Figure 18:
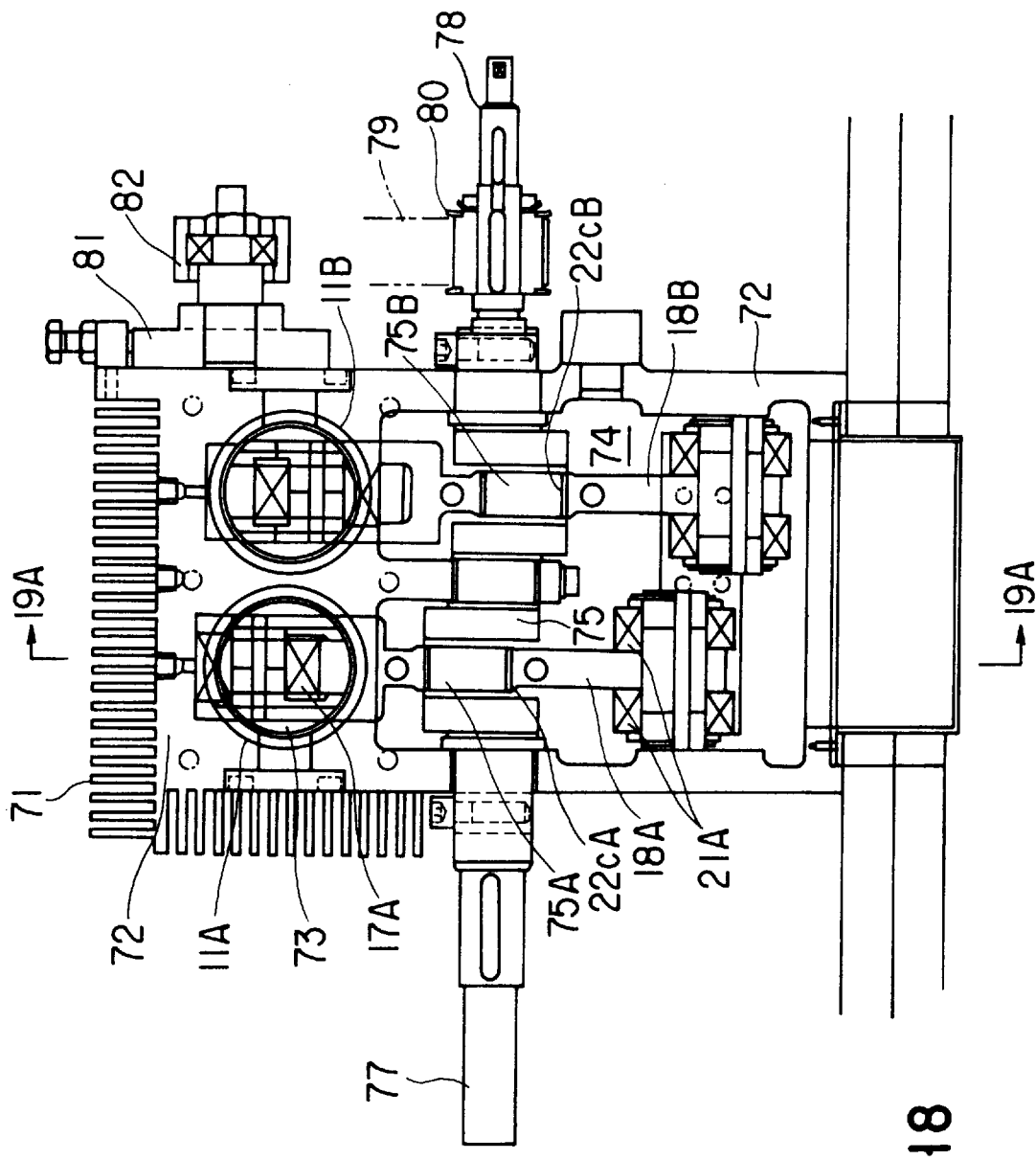
FIG. 18 is a front view showing a, cross-section of a movable outer fulcrum type Z-mechanism engine according to a still further embodiment of the present invention.
Figure 19:
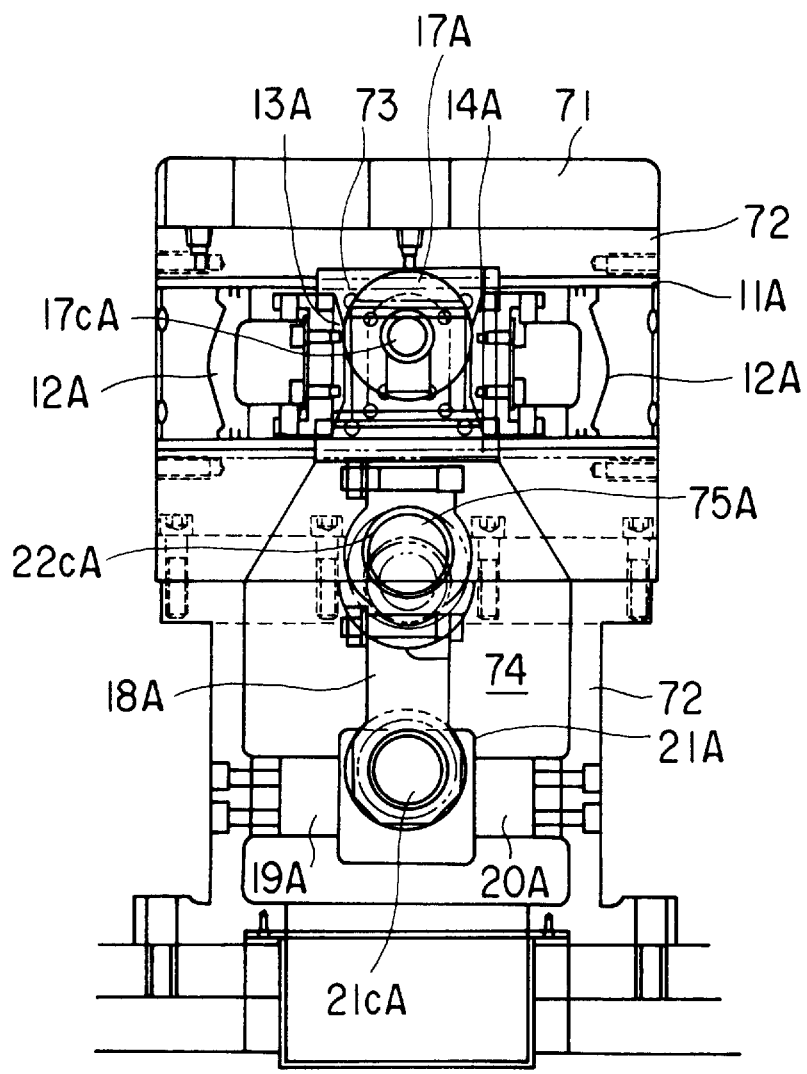
FIG. 19 is a side view showing a cross-section of the movable outer fulcrum type Z-mechanism engine according to the embodiment of FIG. 18.

FIGS. 18 and 19 show an embodiment in which the basic structure of the embodiment shown in FIG. 1 is used in two sets thereby to extract outputs from two pistons as one output combined by one single crankshaft. Those components of FIGS. 18 and 19 which correspond to the components of FIG. 1 are referred to by the same or similar reference numerals.

In FIG. 18, two cylinders 11A and 11B having an equal inner diameter and extending in the horizontal direction are formed in a cylinder block 72 surrounded by heat radiating fins 71. FIG. 19 is a view cut along line 19A—19A of FIG. 18 showing an engine including a cylinder 11A having a structure corresponding to that of FIG. 1. The other cylinder 11B also has the same structure.

A piston 12A is inserted in the cylinder 11A, and a pair of roller guide plates 13A and 14A are provided in an opening portion 73 open in a center portion of the piston 12A toward a downward direction, such that the plates 13A and 14A are fixed to the body of the piston 12A by, screws with a predetermined distance maintained between the plates. A rotation roller 17A is inserted between the roller guide plates 13A and 14A, and the roller 17A is rotatably installed on a force point of a lever member 18A by a pin 17cA. A roller 21A is installed on a pin 2lcA which serves as a fulcrum for the lever member 18A. The roller 21A is retained between a pair of guide plates 19A and 20A installed on the cylinder block 72 such that the plates 19A, 20A project into the crank chamber 74 formed in a lower portion of the cylinder block 72. The roller 21A and the pair of guide plates 19A and 20A constitute a movable fulcrum regulator.

A round hole 22cA which functions as an action point is formed in a mid-point of the lever member 18A, and a crank pin 75A of a crankshaft 75 is engaged in the action point hole 22cA. Another crank pin 75B is also formed on the crankshaft 75, and is engaged in an action point hole 22cB formed in a lever member 18B provided in conjunction with another cylinder 11B.

The crankshaft 75 penetrates through walls of the cylinder block 72 forming the crank chamber 74 and is supported by the walls. A projecting portion of the crankshaft is used as a rotation main shaft 77 for extracting an output and another projecting portion thereof is connected to a camshaft not shown and a drive gear 82 of a starter motor through a belt 79 and a pulley 80 as connecting components, thereby to drive cams installed on the camshaft. The cams drive intake and exhaust valves provided on the cylinder heads at predetermined timings, thereby to prosecute four processes of a four-cycle engine, i.e., expansion, exhausting, intake, and compression.

Figure 20:
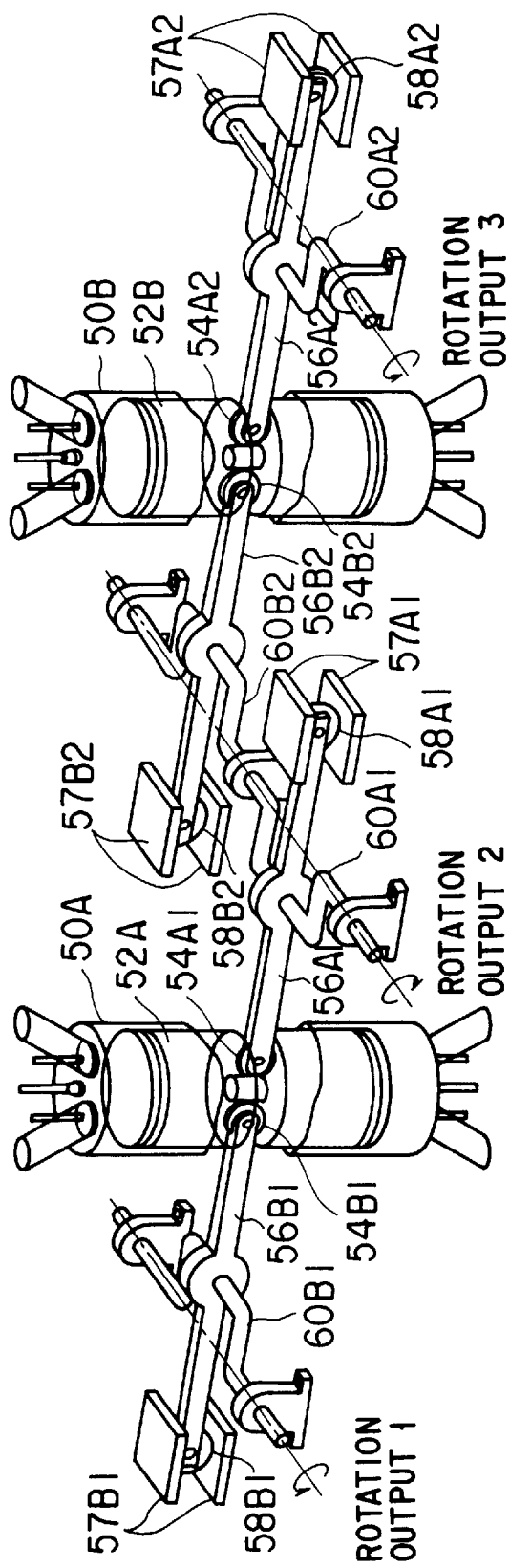
FIG. 20 is a perspective view showing a movable outer fulcrum type Z-mechanism engine according to a further embodiment of the present invention.

FIG. 20 is a perspective view schematically showing an embodiment which uses two basic structures each corresponding to the basic structure shown in FIG. 17 to obtain three rotation outputs. Therefore, those components which are common to those of FIG. 17 are referred to by the same or similar reference numerals and detailed explanation of those components will be omitted in the following.

In this figure, a twin coaxial piston 52A is inserted in a first cylinder 50A, and the output of the piston 52A is extracted from lever members 56B1 and 56A1 through two movable force point rollers 54B1 and 54A1. A fulcrum at another end of the lever member 56B1 is supported by a pair of guide plates 57B1 and a roller 58B1 which constitute a movable fulcrum regulator, such that this fulcrum can freely move along the plates 57B1. Therefore, the swing torque of the lever member 56B1 is converted into rotation of a crankshaft 60B1, and is extracted as a first rotation output 1 indicated by an arrow.

A fulcrum at another end of the lever member 56A1 is supported by a pair of guide plates 57A1 and a roller 58A1 which constitute a movable fulcrum 34 regulator, such that this fulcrum can freely move. Therefore, the swing torque of the lever member 56A1 is converted into rotation of a crankshaft 60A1, and is extracted as a second rotation output 2 in the direction opposite to the first rotation, indicated by another arrow.

Another twin coaxial piston 52B is inserted in a second cylinder 50A, and the output of the piston 52B is extracted from lever members 56B2 and 56A2 through two movable force point rollers 54B2 and 54A2. Note that the twin coaxial pistons 52A and 52B have driving phases opposite to each other and are driven such that, for example, when the piston 52A is at a top dead point, the piston 52B is at a bottom dead point. A fulcrum at another end of the lever member 56B2 is supported by a pair of guide plates 57B2 and a roller 58B2 which constitute a movable fulcrum regulator, such that this fulcrum can freely move. Therefore, the swing torque of the lever member 56B2 is converted into rotation of a crankshaft 60B2. Since this crankshaft 60B2 is formed to be integral with the crankshaft 60A1 such that these two crankshaft maintains a phase difference of 180°, outputs from these two crankshafts are extracted and united together as the second rotation output 2 indicated by the arrow.

A fulcrum at another end of the lever member 56A2 is supported by a pair of guide plates 57A2 and a roller 58A2 which constitute a movable fulcrum regulator, such that this fulcrum can freely move. Therefore, the swing torque of the lever member 56A2 is converted into rotation of a crankshaft 60A2, and is extracted as a third rotation output 3 indicated by another arrow of the same direction as the arrow of the first rotation output 1.

The above embodiments are examples in which reciprocal motion of a piston is transmitted to a crank device through a lever device of a movable outer fulcrum type and is then extracted as a rotary motion from a fulcrum at a mid-point of the lever member. If the lever member of this lever device is extended from the position of the movable outer fulcrum and a movable action point regulator consisting of a pair of guide plates and a roller is formed on the top end of the extended lever member such that, for example, a piston of a pump is reciprocated by the action point regulator, mechanical outputs of two different types can be extracted from one engine.

Figure 21:
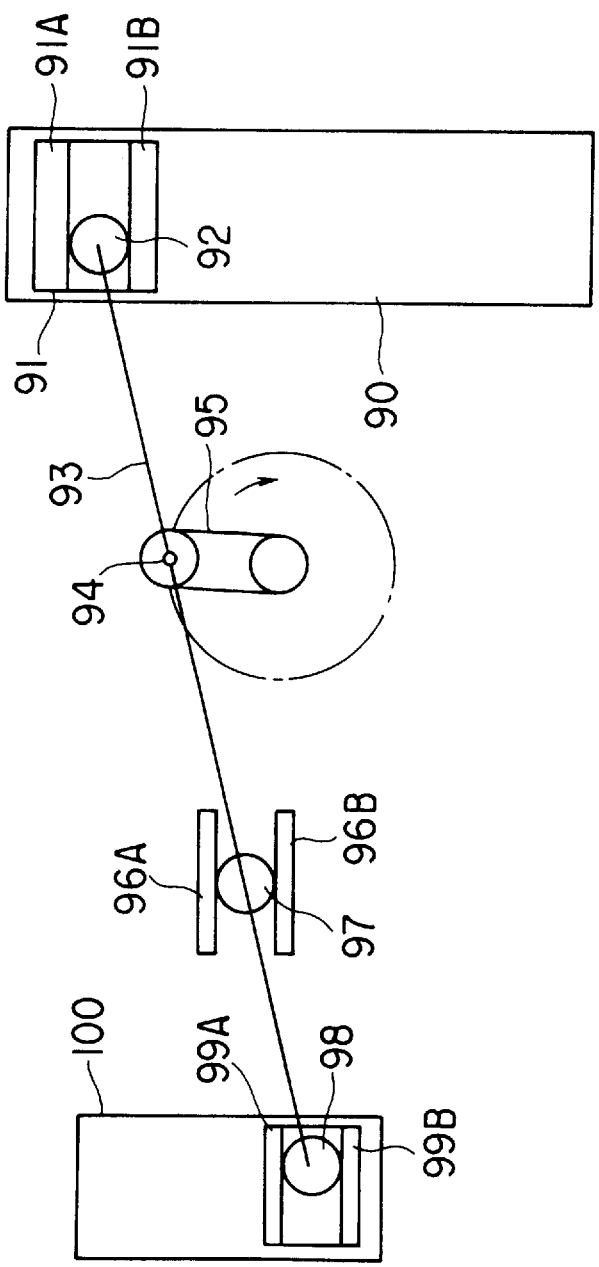
FIG. 21 is a view schematically showing a structure of a movable outer fulcrum type Z-mechanism engine according to a further embodiment of the present invention.

FIG. 21 is a view schematically showing the structure of an example of such an engine as stated above. Reciprocal motion of a piston 91 inserted in a cylinder 90 having the same structure as in FIG. 1 is transmitted to a lever member 93 through a force point regulator consisting of guide plates 91A and 91 and a roller 92, and is then converted into rotary motion of a crankshaft 95 connected to an action point 94. Another end of the lever member 93 is supported by a movable fulcrum regulator consisting of a pair of guide plates 96A and 96B and a roller 97. This end of the lever member 93 is further extended, and a roller 98 is rotatably secured to the extended end of the lever member 93. This roller 98 is inserted between a guide plates 99A and 99B, thereby functioning as an action point regulator. The pair of guide plates 99A and 99B are formed to be integral with each other and are used as a piston which reciprocates within a cylinder 100. This structure of the cylinder 100 therefore can be used as a pump, for example.

In this structure, reciprocal motion of the piston 91 is transmitted to the crank device 95 through the lever device 93 of a movable outer fulcrum type and is then extracted as rotary motion from the support point 94 at a mid-point of the lever member 93. Further, a movable action point regulator consisting of the pair of guide plates 99A, 99B and the roller 98 is formed on the extended top end of the lever member 93 such that the piston of a pump is reciprocated by the action point regulator. Therefore, mechanical outputs of two different types can be extracted from one engine.

In the embodiment of FIG. 18, reciprocal motion of two pistons respectively inserted in two cylinders arranged in parallel with each other is transmitted through lever devices of a movable outer fulcrum type to crank pins which have different rotation phases and are connected with one single crankshaft, thereby to extract one single output. However, two cylinders may be arranged apart from each other and one single output may be extracted from the cylinders in a manner different from the embodiment of FIG. 18.

Figure 22:
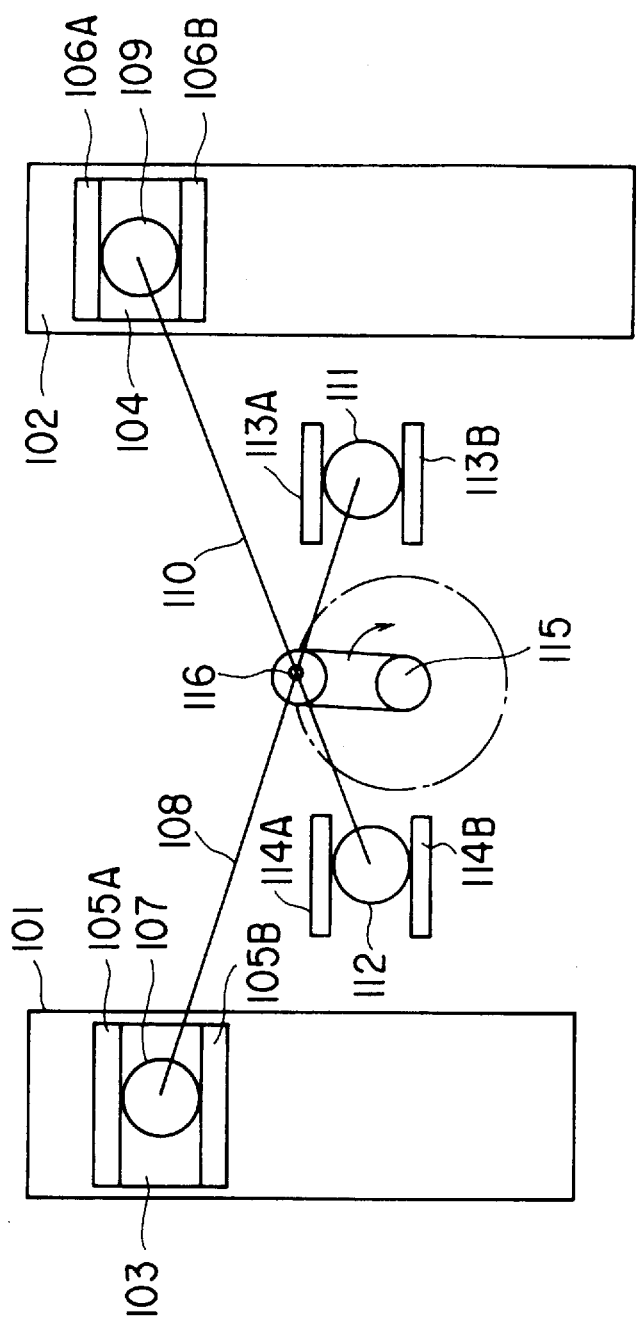
FIG. 22 is a view schematically showing a structure of a movable outer fulcrum type Z-mechanism engine according to a further embodiment of the present invention.

FIG. 22 shows an example of such a different manner. Pistons 103 and 104 inserted in two cylinders 101 and 102 have a pair of guide plates 105A and 105B and a pair of guide plates 106A and 106B, respectively. A roller 107 is inserted between the guide plates 105A and 105B, and this roller 107 is rotatably secured to a force point of a first lever member 108. A roller 109 is inserted between the guide plates 106A and 106B, and this roller 109 is rotatably secured to a force point of a second lever member 110.

Rollers 111 and 112 are respectively secured to fulcrums of other ends of the lever members 108 and 110. These rollers 111 and 112 are respectively inserted between a pair of guide plates 113A and 113B and between a pair of guide plates 114A and 114B, and are thereby supported.

In FIG. 22, when the pistons 103 and 104 are pressed downwardly in the cylinders 101 and 102 by expansion of a combustion gas, the motion of these pistons 103, 104 are transmitted to the lever members 108, 110 through the movable force point regulators consisting of guide plates 105A, 105B, 106A, and 106B and rollers 107 and 109. Since fulcrums of the lever members 108 and 110 are respectively supported by the movable outer fulcrum regulators consisting of the roller 111 and the pair of guide plates 113A and 113B as well as the pair of guide plates 114A and 114B, linear motion of the pistons 103 and 104 are smoothly converted into rotary motion of a crank pin 116 of a crankshaft 115.

All of the above embodiments relate to an apparatus for conversion between rotary motion and linear reciprocal motion. The present invention, however, may apply to an apparatus for directly converting rotary motion into a reciprocal motion of a lever member, as explained in the following embodiment.

Figure 23:
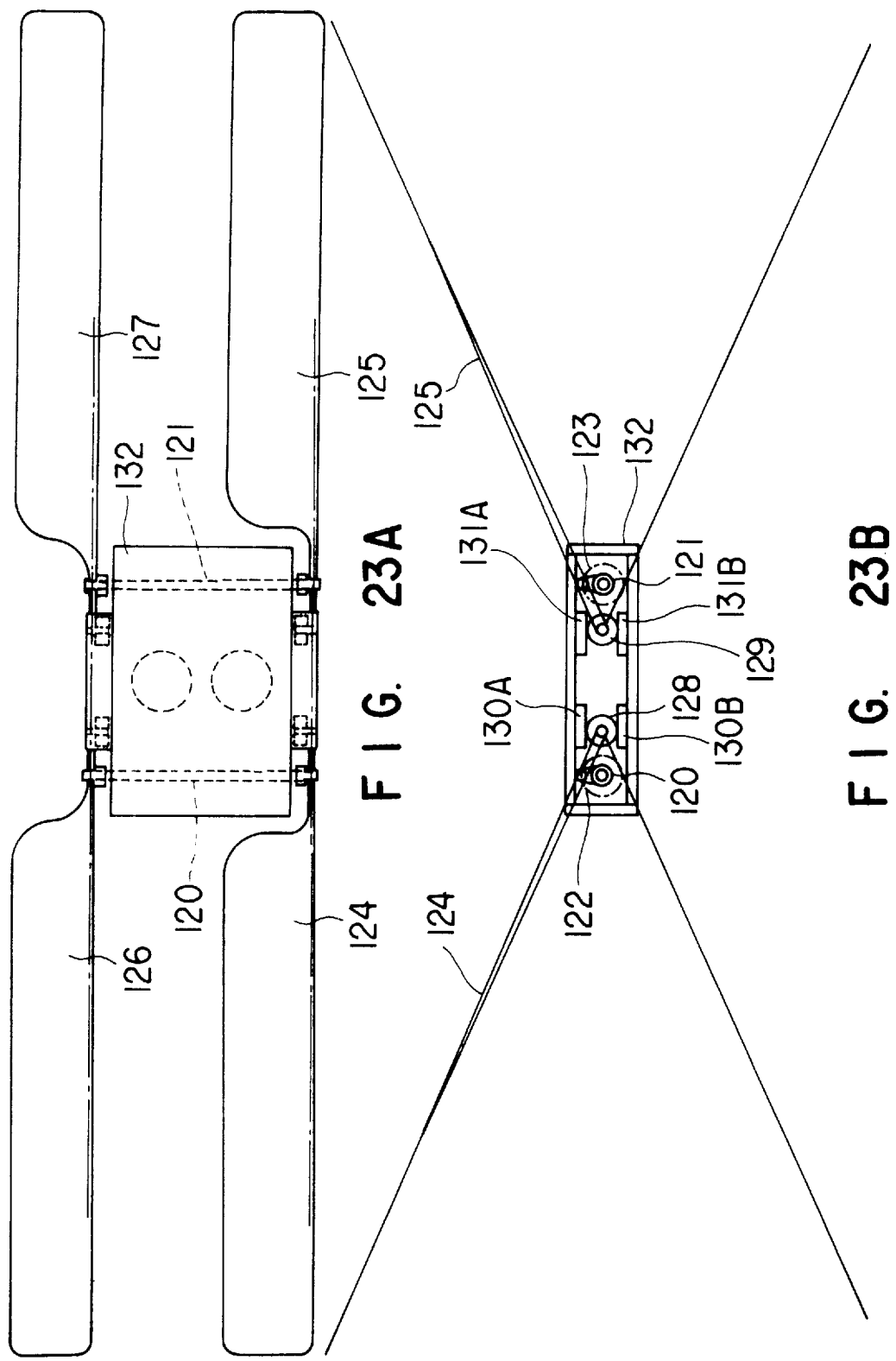
FIGS. 23A and 23B are views schematically showing a structure of a flying device constituted with use of an apparatus for mutual conversion between circular motion and reciprocal motion according to the present invention.

FIGS. 23A and 23B show an example of the apparatus. In this figure, rotation shafts 120 and 121 are respectively connected to an electric motor through power transmission mechanisms not shown and are thereby driven to rotate. The rotation shafts 120 and 121 have ends rotatably connected by arms 122 and 123 to lever members 124 and 125 at positions apart by a predetermined distance from ends of these lever members 124, 125. Other ends of the rotation shafts 120 and 121 are rotatably connected through arms to lever members 126 and 127 at positions apart by a predetermined distance from ends of these lever members 126, 127.

Rollers 128 and 129 are rotatably secured at ends of the lever members 124 and 125, thereby to constitute movable fulcrums. The roller 128 is rotatably and movably supported between two parallel guide plates 130A and 130B, while the roller 129 is rotatably and movably supported between two parallel guide plates 131A and 131B. All of these components are contained in a casing 132 of a rectangular parallelepiped except for lever members 124 and 125. Components relevant to the other lever members 126 and 127 are also contained in the casing 132. In addition, the lever members 124, 125, 126, and 127 are formed like a flying object, e.g., wings of a dragonfly.

In this structure, when rotation shafts 120 and 121 are rotated by supplying electric power to an electric motor not shown, the lever members 124 and 125 are reciprocally swung around the axes of the rollers 128 and 129, shafts as centers of rotations. Since the rollers 128 and 129 are rotatably and movably supported between the guide plates 130A and 130B as well as 131A and 131B, rotations of the rotation shafts 120 and 121 are smoothly converted into reciprocal motion of the lever members 124 and 125. The angle of the reciprocal swing of the lever members 124, 125 can be changed in accordance with a distance between the force points and the movable fulcrum rollers 128 and 129 as well as the sizes of arms 122 and 123, so that the angle of flapping motion of wings 124 and 125 as the lever members can be changed. The other pair of wings 126 and 127 can be driven in the same manner.

As has been described above, according to the present invention, it is possible to provide an apparatus for conversion between rotary motion and reciprocal motion which enables reduction in energy losses when reciprocal motion of a piston of a two- or four-cycle engine is converted into rotary motion, reduction in size and/or weight of the engine, and further reduction in weight by forming the engine with ceramics.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An apparatus for mutual conversion between circular motion and reciprocal motion, comprising:

a lever member;

a regulator system provided at one end of the lever member, the regulator system including a fulcrum member functioning as a movable fulcrum;

an action or force point member provided at another end of the lever member; and an intermediate point between said one end and said another end of the lever member, the intermediate point functioning as an action or a force point rotatably secured to the lever member on a line connecting a rotation center of a rotary member and a circumference of the rotary member, and wherein the regulator system further comprises a support section for supporting the fulcrum member such that the movable fulcrum is movable in a lengthwise direction of the lever member, and wherein said regulator system is formed such that distances between the force point member, the intermediate action point and the fulcrum member are held constant.

2. An apparatus for mutual conversion between circular motion and reciprocal motion, comprising:

a) a lever member including:

i) a first regulator provided at a first end of the lever member for functioning as a force point, the first regulator having:

A) a first roller rotatably mounted at the force point to said first end of the lever member, and B) guide members for movably guiding the first roller such that the force point is movable in a lengthwise direction of the lever member;

ii) a second regulator provided at a second end of the lever member for functioning as a movable fulcrum, the second regulator having:

A) a second roller rotatably mounted at the fulcrum to said second end of the lever member, and B) guide members for movably guiding the second roller such that the movable fulcrum is movable in the lengthwise direction of the lever member; and iii) an intermediate point between the first and second ends of the lever, the intermediate point functioning as an action point rotatably secured at a crankshaft; and b) a reciprocal motor connected with the first regulator.

3. An apparatus according to claim 2, wherein the reciprocal motor includes:

a piston connected with the first regulator, and a cylinder into which the piston is movably inserted, the cylinder having cylinder heads.

4. An apparatus for mutual conversion between circular motion and reciprocal motion, comprising:

a) a lever member including:

i) a first regulator provided at a first end of the lever member, the first regulator having:

A) a first roller rotatably mounted to said first end of the lever member, and

B) guide members for movably guiding the first roller such that the first end of the lever member is movable in a lengthwise direction of the lever member;

ii) a second regulator provided at a second end of the lever member for functioning as a movable fulcrum, the second regulator having:

A) a second roller rotatably mounted to the second end of the lever member, and

B) guide members for movably guiding the second roller of the lever member such that the second end of the lever member is movable in the lengthwise direction of the lever member; and iii) an intermediate point between the first and second ends of the lever, the intermediate point being rotatably secured to a crankshaft; and b) a reciprocal motion member connected with the first regulator.

* * * * *